(12) United States Patent
You et al.

(10) Patent No.: US 11,258,502 B2
(45) Date of Patent: Feb. 22, 2022

(54) COMMUNICATIONS METHOD AND APPARATUS FOR BEAM FAILURE RECOVERY OF MULTIPLE SERVING CELLS

(71) Applicant: HUAWEI TECHNOLOGIES CO., LTD., Shenzhen (CN)

(72) Inventors: Chunhua You, Shanghai (CN); Qinghai Zeng, Shanghai (CN); Hongping Zhang, Shanghai (CN); Qufang Huang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/904,710

(22) Filed: Jun. 18, 2020

(65) Prior Publication Data
US 2020/0322031 A1    Oct. 8, 2020

Related U.S. Application Data

(63) Continuation of application No. PCT/CN2018/122462, filed on Dec. 20, 2018.

(30) Foreign Application Priority Data

Dec. 22, 2017   (CN) .......................... 201711409105.2

(51) Int. Cl.
*H04B 7/06*   (2006.01)
*H04W 76/11*   (2018.01)
(Continued)

(52) U.S. Cl.
CPC ........ *H04B 7/0695* (2013.01); *H04W 72/046* (2013.01); *H04W 72/0453* (2013.01);
(Continued)

(58) Field of Classification Search
CPC ... H04B 7/0695; H04B 7/0617; H04W 76/11; H04W 72/0453; H04W 72/046;
(Continued)

(56) References Cited

U.S. PATENT DOCUMENTS

2019/0037498 A1*   1/2019   Tseng ................ H04W 52/0219
2020/0383165 A1*  12/2020   Takahashi ............. H04W 56/00
2020/0404638 A1*  12/2020   Deogun ................ H04L 5/0091

FOREIGN PATENT DOCUMENTS

CN    106792564 A    5/2017
CN    107005858 A    8/2017
(Continued)

OTHER PUBLICATIONS

Huawei, Hisilicon, "RAN2 aspects of DL beam management", 3GPP TSG-RAN WG2#99bis, Prague, Czech Republic, Oct. 9-13, 2017, R2-1710562, 4 pages.

Huawei, Hisilicon, "Procedure details for beam failure recovery", 3GPP TSG RAN WG1 NR Ad Hoc Meeting, Qingdao, China, Jun. 27-30, 2017, R1-1709930, 5 pages.
(Continued)

*Primary Examiner* — Ivan O Latorre
(74) *Attorney, Agent, or Firm* — Maier & Maier, PLLC

(57) ABSTRACT

A communications method and apparatus. The communications method includes: transmitting a first request to a network device through a first resource, where the first request is used to request beam failure recovery of a first cell or is used to request system information of the first cell, the first resource is a resource of a second cell, and the first cell and the second cell are serving cells of a same terminal; and receiving a first response corresponding to the first request from the network device. Therefore, when a terminal has a plurality of serving cells, the terminal may transmit a request across cells (or across carriers), to improve transmission reliability.

13 Claims, 12 Drawing Sheets

(51) Int. Cl.
  *H04W 72/04* (2009.01)
  *H04W 72/08* (2009.01)
  *H04W 74/08* (2009.01)

(52) U.S. Cl.
  CPC ..... *H04W 72/0466* (2013.01); *H04W 72/087* (2013.01); *H04W 74/0833* (2013.01); *H04W 76/11* (2018.02)

(58) Field of Classification Search
  CPC .......... H04W 72/0466; H04W 72/087; H04W 74/0833; H04L 1/20; H04L 1/1607; H04L 5/0023; H04L 5/001; H04L 5/0053
  See application file for complete search history.

(56) References Cited

FOREIGN PATENT DOCUMENTS

| | | |
|---|---|---|
| CN | 107079459 A | 8/2017 |
| CN | 107251612 A | 10/2017 |
| WO | 2017024516 A1 | 2/2017 |

OTHER PUBLICATIONS

Institute for Information Industry (III), "Discussion on beam failure recovery mechanism", 3GPP TSG-RAN WG1 Meeting #89, Hangzhou, China, May 15-19, 2017, R1-1708874, 4 pages.

R1-1720719 Ericsson,"Multi-cell beam recovery", 3GPP TSG-RAN WG1 #91, Reno, USA, Nov. 27-Dec. 1, 2017, 5 pages.

R1-1719770 vivo,"Remaining details on mechanism to recover from beam failure", 3GPP TSG RAN WG1 Meeting #91, Reno, USA, Nov. 27-Dec. 1, 2017, 6 pages.

R1-1708135 Huawei, HiSilicon,"Beam failure recovery ", 3GPP TSG RAN WG1 Meeting #89, Hangzhou, China, May 15-19, 2017, 9 pages.

R1-1701719 Huawei, HiSilicon,"Beam management across multiple carriers", 3GPP TSG RAN WG1 meeting #88, Athens, Greece, Feb. 13-17, 2017, 5 pages.

R1-1717473 vivo,"Discussion on beam failure recovery", 3GPP TSG RAN WG1 Meeting #90bis, Prague, CZ, Oct. 9-13, 2017, 7 pages.

R1-1609309 CMCC,"RACH in Gradual UE-Specific (GUS) initial access", 3GPP TSG RAN WG1 Meeting #86bis, Lisbon, Portugal, Oct. 10-14, 2016, 7 pages.

* cited by examiner

COMMUNICATIONS METHOD AND APPARATUS FOR BEAM FAILURE RECOVERY OF MULTIPLE SERVING CELLS

CROSS-REFERENCE TO RELATED APPLICATIONS

This application is a continuation of International Application No. PCT/CN2018/122462, filed on Dec. 20, 2018, which claims priority to Chinese Patent Application No. 201711409105.2, filed on Dec. 22, 2017. The disclosures of the aforementioned applications are hereby incorporated by reference in their entireties.

TECHNICAL FIELD

Embodiments relate to the field of communications technologies, and in particular, to a communications method and apparatus.

BACKGROUND

To ensure effective transmission of a service, a beamforming technology is introduced to a cell. To be specific, a base station concentrates energy of signals in a required direction, and transmits the signals to a terminal through a beam in the direction, improving a demodulation signal-to-noise ratio of the terminal and improving experience of a cell edge user. When quality of all serving beams of the terminal does not meet a condition, it indicates that a beam failure occurs. To ensure communication between the terminal and the base station, beam failure recovery (BFR) needs to be performed. To be specific, the terminal re-determines, in candidate beams, a candidate beam whose quality meets the condition, then transmits a BFR request (BFRQ) to the base station, and notifies, through the request, the base station of the candidate beam selected by the terminal, so that the base station uses the candidate beam as a serving beam for communication between the base station and the terminal. Currently, such a BFR solution is applied to a scenario in which the terminal has only one serving cell. However, when carrier aggregation (CA) and/or dual connectivity (DC) are/is configured for user equipment (UE), that is, the UE has a plurality of serving cells, how the UE transmits the BFRQ to the base station is an urgent problem to be resolved.

SUMMARY

Embodiments provide a communications method and apparatus, to transmit a request across cells, improving transmission reliability. For example, the request is used to request BFR or request system information.

According to a first aspect, an embodiment provides a communications method, including: transmitting a first request to a network device through a first resource, where the first request is used to request BFR of a first cell or is used to request system information of the first cell, the first resource is a resource of a second cell, and the first cell and the second cell are serving cells of a same terminal; and then receiving, from the network device, a first response corresponding to the first request.

Therefore, when a terminal has a plurality of serving cells, the terminal may transmit a request across cells (or across carriers), to improve transmission reliability.

In a possible embodiment, the method further includes: receiving configuration information from the network device, where the configuration information includes indication information of the first resource; and the transmitting a first request to a network device through a first resource includes: transmitting the first request to the network device through the first resource based on the indication information of the first resource that is in the configuration information.

In a possible embodiment, the method further includes: receiving, from the network device, a first association relationship between identification information of at least one beam of the first cell and a part or all of the first resource; and the transmitting a first request to a network device through a first resource includes: transmitting the first request to the network device through the first resource based on a first beam of the first cell and the first association relationship, where the first beam is a beam that is of the first cell and whose signal quality meets a preset condition.

In a possible embodiment, the method further includes: receiving, from the network device, a second association relationship between the part or all of the first resource and identification information of an uplink frequency band; the transmitting the first request to the network device through the first resource based on a first beam of the first cell and the first association relationship includes: transmitting the first request to the network device through the first resource based on the first beam, the first association relationship, and the second association relationship.

In a possible embodiment, the receiving, from the network device, a first response corresponding to the first request includes: receiving the first response from the network device based on a reception parameter of the first response, where the reception parameter of the first response is determined based on a reception parameter of the first beam.

In a possible embodiment, the first request is a random access preamble or uplink control information.

In a possible embodiment, the receiving, from the network device, a first response corresponding to the first request includes: receiving the first response from the network device through the first cell.

In a possible embodiment, the first response is a physical downlink control channel (PDCCH) scrambled by using a cell radio network temporary identifier (C-RNTI), or the first response is a random access response.

In a possible embodiment, the receiving, from the network device, a first response corresponding to the first request includes: receiving the first response from the network device through a serving cell other than the first cell, where the first response includes identification information of the first cell.

In a possible embodiment, the first request further includes identification information of the first beam, and the first beam is the beam that is of the first cell and whose signal quality meets the preset condition.

In a possible embodiment, the first request further includes the identification information of the first cell.

In a possible embodiment, before the transmitting a first request to a network device through a first resource, the method further includes: transmitting a random access preamble to the network device through the second cell, and receiving, from the network device through the second cell, a random access response corresponding to the random access preamble;

the transmitting a first request to a network device through a first resource includes:

transmitting the first request to the network device through the second cell based on the random access response; and the receiving, from the network device, a first response corresponding to the first request includes: receiving, from the network device through the second cell, the first response corresponding to the first request, where the first response is the PDCCH scrambled by using the C-RNTI.

In a possible embodiment, the receiving, from the network device through the second cell, the first response corresponding to the first request includes: receiving, from the network device through the second cell and based on the reception parameter of the first response, the first response corresponding to the first request, where the reception parameter of the first response is determined based on the reception parameter of the first beam.

According to a second aspect, an embodiment provides a communications method, including: receiving a first request from a terminal through a first resource, where the first request is used to request BFR of a first cell or is used to request system information of the first cell, the first resource is a resource of a second cell, and the first cell and the second cell are serving cells of the terminal; and then transmitting, to the terminal, a first response corresponding to the first request.

In a possible embodiment, the method further includes: transmitting configuration information to the terminal, where the configuration information includes indication information of the first resource.

In a possible embodiment, the method further includes: transmitting a first association relationship between identification information of at least one beam of the first cell and a part or all of the first resource to the terminal.

In a possible embodiment, the method further includes: transmitting a second association relationship between the part or all of the first resource and identification information of an uplink frequency band to the terminal.

In a possible embodiment, the transmitting, to the terminal, a first response corresponding to the first request includes: transmitting the first response to the terminal based on a transmission parameter of the first response, where the transmission parameter of the first response is obtained based on the part or all of the first resource for receiving the first request and the first association relationship.

In a possible embodiment, the first request is a random access preamble or uplink control information.

In a possible embodiment, the transmitting, to the terminal, a first response corresponding to the first request includes: transmitting the first response to the terminal through the first cell.

In a possible embodiment, the first response is a PDCCH scrambled by using a C-RNTI, or the first response is a random access response.

In a possible embodiment, the transmitting, to the terminal, a first response corresponding to the first request includes: transmitting the first response to the terminal through a serving cell of the terminal that is other than the first cell, where the first response includes identification information of the first cell.

In a possible embodiment, the first request further includes identification information of a first beam, and the first beam is a beam that is of the first cell and whose signal quality meets a preset condition.

In a possible embodiment, the first request further includes the identification information of the first cell.

In a possible embodiment, before the receiving a first request from a terminal through a first resource, the method further includes: receiving a random access preamble from the terminal through the second cell, and transmitting, to the terminal through the second cell, a random access response corresponding to the random access preamble; and the transmitting, to the terminal, a first response corresponding to the first request includes: transmitting the first response to the terminal through the second cell, where the first response is the PDCCH scrambled by using the C-RNTI.

In a possible embodiment, the transmitting the first response to the terminal through the second cell includes: transmitting the first response to the terminal through the second cell based on the transmission parameter of the first response, where the transmission parameter of the first response is determined based on a transmission parameter of the first beam.

According to a third aspect, an embodiment provides a communications apparatus, including:

a transmit module, configured to transmit a first request to a network device through a first resource, where the first request is used to request BFR of a first cell or is used to request system information of the first cell, the first resource is a resource of a second cell, and the first cell and the second cell are serving cells of a same terminal; and a receive module, configured to receive, from the network device, a first response corresponding to the first request.

In a possible embodiment, the receive module is further configured to receive configuration information from the network device, where the configuration information includes indication information of the first resource; and the transmit module is configured to transmit the first request to the network device through the first resource based on the indication information of the first resource that is in the configuration information.

In a possible embodiment, the receive module is further configured to receive a first association relationship between identification information of at least one beam of the first cell and a part or all of the first resource; and the transmit module is configured to transmit the first request to the network device through the first resource based on a first beam of the first cell and the first association relationship, where the first beam is a beam that is of the first cell and whose signal quality meets a preset condition.

In a possible embodiment, the receive module is further configured to receive a second association relationship between the part or all of the first resource and identification information of an uplink frequency band; and the transmit module is configured to transmit the first request to the network device through the first resource based on the first beam, the first association relationship, and the second association relationship.

In a possible embodiment, the receive module is configured to receive the first response from the network device based on a reception parameter of the first response, where the reception parameter of the first response is determined based on a reception parameter of the first beam.

In a possible embodiment, the first request is a random access preamble or uplink control information.

In a possible embodiment, the receive module is configured to receive the first response from the network device through the first cell.

In a possible embodiment, the first response is a PDCCH scrambled by using a C-RNTI, or the first response is a random access response.

In a possible embodiment, the receive module is configured to receive the first response from the network device through a serving cell different from the first cell, where the first response includes identification information of the first cell.

In a possible embodiment, the first request further includes identification information of the first beam, and the first beam is the beam that is of the first cell and whose signal quality meets the preset condition.

In a possible embodiment, the first request further includes the identification information of the first cell.

In a possible embodiment, the transmit module is further configured to transmit a random access preamble to the network device through the second cell before transmitting the first request to the network device through the first resource;

the receive module is further configured to receive, from the network device through the second cell, a random access response corresponding to the random access preamble;

when transmitting the first request to the network device through the first resource, the transmit module is configured to transmit the first request to the network device through the second cell based on the random access response; and when receiving the first response corresponding to the first request from the network device, the receive module is configured to receive, from the network device through the second cell, the first response corresponding to the first request, where the first response is the PDCCH scrambled by using the C-RNTI.

In a possible embodiment, the receive module is configured to receive, from the network device through the second cell based on the reception parameter of the first response, the first response corresponding to the first request, where the reception parameter of the first response is determined based on the reception parameter of the first beam.

It should be noted that the communications apparatus in the third aspect may be a terminal, or may be a chip applicable to a terminal.

According to a fourth aspect, an embodiment provides a communications apparatus, including:

a receive module, configured to receive a first request from a terminal through a first resource, where the first request is used to request BFR of a first cell or is used to request system information of the first cell, the first resource is a resource of a second cell, and the first cell and the second cell are serving cells of the terminal; and a transmit module, configured to transmit, to the terminal, a first response corresponding to the first request.

In a possible embodiment, the transmit module is further configured to transmit configuration information to the terminal, where the configuration information includes indication information of the first resource.

In a possible embodiment, the transmit module is further configured to transmit a first association relationship between identification information of at least one beam of the first cell and a part or all of the first resource to the terminal.

In a possible embodiment, the transmit module is further configured to transmit a second association relationship between the part or all of the first resource and identification information of an uplink frequency band to the terminal.

In a possible embodiment, the transmit module is configured to transmit the first response to the terminal based on a transmission parameter of the first response, where the transmission parameter of the first response is obtained based on the part or all of the first resource for receiving the first request and the first association relationship.

In a possible embodiment, the first request is a random access preamble or uplink control information.

In a possible embodiment, the transmit module is configured to transmit the first response to the terminal through the first cell.

In a possible embodiment, the first response is a PDCCH scrambled by using a C-RNTI, or the first response is a random access response.

In a possible embodiment, the transmit module is configured to transmit the first response to the terminal through a serving cell of the terminal that is different from the first cell, where the first response includes identification information of the first cell.

In a possible embodiment, the first request further includes identification information of a first beam, and the first beam is a beam that is of the first cell and whose signal quality meets a preset condition.

In a possible embodiment, the first request further includes the identification information of the first cell.

In a possible embodiment, the receive module is further configured to receive a random access preamble from the terminal through the second cell before receiving the first request from the terminal through the first resource;

the transmit module is further configured to transmit, to the terminal through the second cell, a random access response corresponding to the random access preamble; and when transmitting, to the terminal, the first response corresponding to the first request, the transmit module is configured to transmit the first response to the terminal through the second cell, where the first response is the PDCCH scrambled by using the C-RNTI.

In a possible embodiment, the transmit module is configured to transmit the first response to the terminal through the second cell based on the transmission parameter of the first response, where the transmission parameter of the first response is determined based on a transmission parameter of the first beam.

It should be noted that the communications apparatus in the fourth aspect may be a network device, or may be a chip applicable to a network device.

According to a fifth aspect, an embodiment provides a terminal, including a transmitter and a receiver. The transmitter and the receiver are configured to perform the communications method according to the embodiment in the first aspect.

According to a sixth aspect, an embodiment provides a network device, including: a receiver and a transmitter. The receiver and the transmitter are configured to perform the communications method according to the embodiment in the second aspect.

According to a seventh aspect, an embodiment provides a chip, including a memory and a processor. The memory is configured to store a program instruction, and the processor is configured to invoke the program instruction in the memory to perform the communications method according to the embodiment in the first aspect.

According to an eighth aspect, an embodiment provides a chip, including a memory and a processor. The memory is configured to store a program instruction, and the processor is configured to invoke the program instruction in the memory to perform the communications method according to the embodiment in the second aspect.

According to a ninth aspect, an embodiment provides a readable storage medium. The readable storage medium stores a computer program. When the computer program is executed, the communications method according to the embodiment in the first aspect is implemented.

According to a tenth aspect, an embodiment provides a readable storage medium. The readable storage medium stores a computer program. When the computer program is executed, the communications method according to the embodiment in the second aspect is implemented.

According to the communications method and the apparatuses provided herein, the terminal transmits the first request to the network device through a resource of the serving cell other than the first cell, where the first request is related to the first cell, and is used to request BFR of the first cell or request the system information of the first cell. Therefore, when the terminal has the plurality of serving cells, the terminal may transmit the request across the cells (or across the carriers), to improve transmission reliability.

According to an eleventh aspect, an embodiment provides a communications method, including: transmitting a first request to a network device after a beam failure occurs in a first cell, where the first request includes an identifier of a first beam of the first cell; receiving, from the network device, a first response corresponding to the first request; and then determining a reception parameter of at least one PDCCH of a second cell based on a reception parameter of the first beam and the first response.

In a possible embodiment, the reception parameter of the PDCCH includes a reception parameter of a demodulation reference signal (DMRS) of the PDCCH.

In a possible embodiment, the first response includes identification information of the at least one PDCCH of the second cell; and the determining a reception parameter of at least one PDCCH of a second cell based on a reception parameter of the first beam and the first response includes: determining, based on at least one piece of identification information in the first response and the reception parameter of the first beam, a reception parameter of at least one PDCCH identified by the at least one piece of identification information.

In a possible embodiment, the identification information of the PDCCH includes identification information of a DMRS port of the PDCCH or identification information of the DMRS of the PDCCH.

In a possible embodiment, the determining a reception parameter of at least one PDCCH of a second cell based on a reception parameter of the first beam and the first response includes: determining the reception parameter of the PDCCH of the second cell based on the reception parameter of the first beam and the first response.

In a possible embodiment, the transmitting a first request to a network device includes: transmitting the first request to the network device through a resource associated with the first beam, where the resource associated with the first beam belongs to the first cell and/or another serving cell other than the first cell.

According to a twelfth aspect, an embodiment provides a communications method, including: receiving a first request from a terminal, where the first request includes an identifier of a first beam of a first cell; transmitting, to the terminal, a first response corresponding to the first request; and determining a transmission parameter of at least one PDCCH of a second cell based on a transmission parameter of the first beam.

In a possible embodiment, the transmission parameter of the PDCCH includes a transmission parameter of a DMRS of the PDCCH.

In a possible embodiment, the first response includes identification information of the at least one PDCCH of the second cell.

In a possible embodiment, the identification information of the PDCCH includes identification information of a DMRS port of the PDCCH or identification information of the DMRS of the PDCCH.

In a possible embodiment, the determining a transmission parameter of at least one PDCCH of a second cell based on a transmission parameter of the first beam includes: determining the transmission parameter of the PDCCH of the second cell based on the transmission parameter of the first beam.

In a possible embodiment, the receiving a first request from a terminal includes: receiving the first request from the terminal through a resource associated with the first beam, where the resource associated with the first beam belongs to the first cell and/or another serving cell other than the first cell.

According to a thirteenth aspect, an embodiment provides a communications apparatus, including:

a transmit module, configured to transmit a first request to a network device after a beam failure occurs in a first cell, where the first request includes an identifier of a first beam of the first cell;

a receive module, configured to receive from the network device, a first response corresponding to the first request; and a processing module, configured to determine a reception parameter of at least one PDCCH of a second cell based on a reception parameter of the first beam and the first response.

In a possible embodiment, the reception parameter of the PDCCH includes a reception parameter of a DMRS of the PDCCH.

In a possible embodiment, the first response includes identification information of the at least one PDCCH of the second cell; the processing module is configured to determine, based on at least one piece of identification information in the first response and the reception parameter of the first beam, a reception parameter of at least one PDCCH identified by the at least one piece of identification information.

In a possible embodiment, the identification information of the PDCCH includes identification information of a DMRS port of the PDCCH or identification information of the DMRS of the PDCCH.

In a possible embodiment, the processing module is configured to determine the reception parameter of the PDCCH of the second cell based on the reception parameter of the first beam and the first response.

In a possible embodiment, the transmit module is configured to transmit the first request to the network device through a resource associated with the first beam, where the resource associated with the first beam belongs to the first cell and/or another serving cell other than the first cell.

It should be noted that the communications apparatus in the thirteenth aspect may be a terminal, or may be a chip applicable to a terminal.

According to a fourteenth aspect, an embodiment provides a communications apparatus, including:

a receive module, configured to receive a first request from a terminal, where the first request includes an identifier of a first beam of a first cell;

a transmit module, configured to transmit, to the terminal, a first response corresponding to the first request; and a processing module, configured to determine a transmission parameter of at least one PDCCH of a second cell based on a transmission parameter of the first beam.

In a possible embodiment, the transmission parameter of the PDCCH includes a transmission parameter of a DMRS of the PDCCH.

In a possible embodiment, the first response includes identification information of the at least one PDCCH of the second cell.

In a possible embodiment, the identification information of the PDCCH includes identification information of a DMRS port of the PDCCH or identification information of the DMRS of the PDCCH.

In a possible embodiment, the processing module is configured to determine the transmission parameter of the PDCCH of the second cell based on the transmission parameter of the first beam.

In a possible embodiment, the receive module is configured to receive the first request from the terminal through a resource associated with the first beam, where the resource associated with the first beam belongs to the first cell and/or another serving cell other than the first cell.

It should be noted that the communications apparatus in the fourteenth aspect may be a network device, or may be a chip applicable to a network device.

According to a fifteenth aspect, an embodiment provides a terminal, including a transceiver and a processor. The transceiver and the processor are configured to perform the communications method according to the embodiment in the eleventh aspect.

According to a sixteenth aspect, an embodiment provides a network device, including a transceiver and a processor. The transceiver and the processor are configured to perform the communications method according to the embodiment in the twelfth aspect.

According to a seventeenth aspect, an embodiment provides a chip, including a memory and a processor. The memory is configured to store a program instruction, and the processor is configured to invoke the program instruction in the memory to perform the communications method according to the embodiment in the eleventh aspect.

According to an eighteenth aspect, an embodiment provides a chip, including a memory and a processor. The memory is configured to store a program instruction, and the processor is configured to invoke the program instruction in the memory to perform the communications method according to the embodiment in the twelfth aspect.

According to a nineteenth aspect, an embodiment provides a readable storage medium. The readable storage medium stores a computer program. When the computer program is executed, the communications method according to the embodiment in the eleventh aspect is implemented.

According to a twentieth aspect, an embodiment provides a readable storage medium. The readable storage medium stores a computer program. When the computer program is executed, the communications method according to the embodiment in the twelfth aspect is implemented.

According to the communications method and the apparatuses provided herein, even though a beam of the first cell fails, a reception parameter of a PDCCH of the another cell other than the first cell can be determined.

According to a twenty-first aspect, an embodiment provides a communications method, including:

receiving a first indication from a network device, where the first indication is used to indicate information about a reception parameter of at least one PDCCH of a first cell; and determining the reception parameter of the at least one PDCCH of the first cell according to the first indication.

In a possible embodiment, the reception parameter of the PDCCH includes a reception parameter of a DMRS of the PDCCH.

In a possible embodiment, the first indication includes identification information of the at least one PDCCH of the first cell and identification information of a beam of a second cell; and the determining the reception parameter of the at least one PDCCH of the first cell according to the first indication includes:

determining the reception parameter of the at least one PDCCH of the first cell based on the first indication and a reception parameter of the beam of the second cell.

In a possible embodiment, the identification information of the PDCCH includes identification information of a DMRS port of the PDCCH or identification information of the DMRS of the PDCCH.

According to a twenty-second aspect, an embodiment provides a communications method, including:

determining a transmission parameter of at least one PDCCH of a first cell; and transmitting a first indication to a terminal, where the first indication is used to indicate information about a reception parameter of the at least one PDCCH of the first cell.

In a possible embodiment, the reception parameter of the PDCCH includes a reception parameter of a DMRS of the PDCCH.

In a possible embodiment, the determining a transmission parameter of at least one PDCCH of a first cell includes:

determining the transmission parameter of the at least one PDCCH of the first cell based on a transmission parameter of a beam of a second cell; and the first indication includes identification information of the at least one PDCCH of the first cell and identification information of the beam of the second cell.

In a possible embodiment, the identification information of the PDCCH includes identification information of a DMRS port of the PDCCH or identification information of the DMRS of the PDCCH.

According to a twenty-third aspect, an embodiment provides a communications apparatus, including:

a receive module, configured to receive a first indication from a network device, where the first indication is used to indicate information about a reception parameter of at least one PDCCH of a first cell; and a processing module, configured to determine the reception parameter of the at least one PDCCH of the first cell according to the first indication.

In a possible embodiment, the reception parameter of the PDCCH includes a reception parameter of a DMRS of the PDCCH.

In a possible embodiment, the first indication includes identification information of the at least one PDCCH of the first cell and identification information of a beam of a second cell; and the processing module is configured to determine the reception parameter of the at least one PDCCH of the first cell based on the first indication and a reception parameter of the beam of the second cell.

In a possible embodiment, the identification information of the PDCCH includes identification information of a DMRS port of the PDCCH or identification information of the DMRS of the PDCCH.

It should be noted that the communications apparatus in the twenty-third aspect may be a terminal, or may be a chip applicable to a terminal.

According to a twenty-fourth aspect, an embodiment provides a communications apparatus, including:

a processing module, configured to determine a transmission parameter of at least one PDCCH of a first cell; and a transmit module, configured to transmit a first indication to a terminal, where the first indication is used to indicate information about a reception parameter of the at least one PDCCH of the first cell.

In a possible embodiment, the transmission parameter of the PDCCH includes a transmission parameter of a DMRS of the PDCCH, and the reception parameter of the PDCCH includes a reception parameter of the DMRS of the PDCCH.

In a possible embodiment, the processing module is configured to obtain the transmission parameter of the at least one PDCCH of the first cell based on a transmission parameter of a beam of a second cell; and the first indication includes identification information of the at least one PDCCH of the first cell and identification information of the beam of the second cell.

In a possible embodiment, the identification information of the PDCCH includes identification information of a DMRS port of the PDCCH or identification information of the DMRS of the PDCCH.

It should be noted that the communications apparatus in the twenty-fourth aspect may be a network device, or may be a chip applicable to a network device.

According to a twenty-fifth aspect, an embodiment provides a terminal, including a transmitter and a processor. The transmitter and the processor are configured to perform the communications method according to the embodiment in the twenty-first aspect.

According to a twenty-sixth aspect, an embodiment provides a network device, including a receiver and a processor. The receiver and the processor are configured to perform the communications method according to the embodiment in the twenty-second aspect.

According to a twenty-seventh aspect, an embodiment provides a chip, including a memory and a processor. The memory is configured to store a program instruction, and the processor is configured to invoke the program instruction in the memory to perform the communications method according to the embodiment in the twenty-first aspect.

According to a twenty-eighth aspect, an embodiment provides a chip, including a memory and a processor. The memory is configured to store a program instruction, and the processor is configured to invoke the program instruction in the memory to perform the communications method according to the embodiment in the twenty-second aspect.

According to a twenty-ninth aspect, an embodiment provides a readable storage medium. The readable storage medium stores a computer program. When the computer program is executed, the communications method according to the embodiment in the twenty-first aspect is implemented.

According to a thirtieth aspect, an embodiment provides a readable storage medium. The readable storage medium stores a computer program. When the computer program is executed, the communications method according to the embodiment in the twenty-second aspect is implemented.

According to the communications method and the apparatuses provided herein, when a cell has no synchronization signal block (SSB) or channel status information-reference signal (CSI-RS), a reception parameter of a PDCCH of the cell may also be obtained.

DESCRIPTION OF EMBODIMENTS

Figure 1:
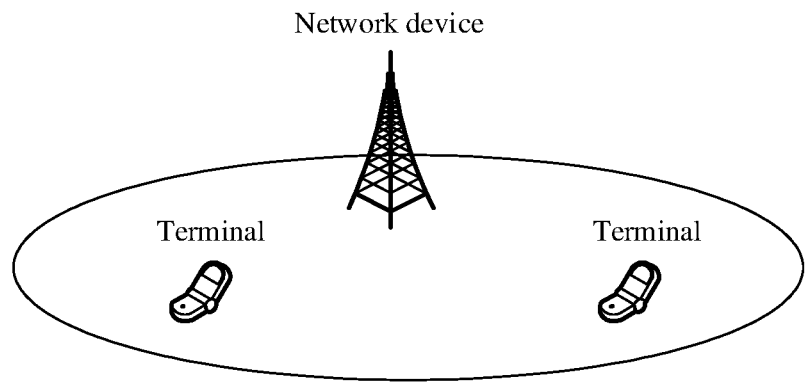
FIG. 1 is a schematic diagram of a communications system according to an embodiment.

FIG. 1 is a schematic diagram of a communications system according to an embodiment. As shown in FIG. 1, the communications system includes a network device and at least one terminal. The network device and the at least one terminal communicate with each other through the following technical solutions provided in embodiments. FIG. 1 shows two terminals, but the embodiments are not limited thereto.

The following explains and describes some terms to facilitate understanding of these terms for a person skilled in the art.

The network device is also referred to as a radio access network (RAN) device, is a device for connecting the terminal to a wireless network, and may be an evolved NodeB (eNB or eNodeB) in long term evolution (LTE), a relay station, an access point, or a Next Generation NodeB (gNB) in a 5G network. This is not limited herein.

The terminal may be a wireless terminal, or may be a wired terminal. The wireless terminal may be a device having a wireless transceiver function, and may be deployed on land, where the deployment includes indoor or outdoor, or handheld or vehicle-mounted deployment, may be deployed on water (for example, on a ship), or may be deployed in air (for example, on an aircraft, a balloon, and a satellite). The terminal may be a mobile phone, a tablet (Pad), a computer having a wireless transceiver function, a virtual reality (VR) terminal, an augmented reality (AR) terminal, a wireless terminal in industrial control, a wireless terminal in self driving, a wireless terminal in a telemedicine (remote medical), a wireless terminal in a smart grid, a wireless terminal in transportation safety, a wireless terminal in a smart city, a wireless terminal in a smart home, and the like. This is not limited herein.

Beams may include a transmit beam and a receive beam. The transmit beam may refer to distribution of signal strength formed in different directions in space after a signal is transmitted through an antenna, and the receive beam may refer to distribution of signal strength that is of a radio signal received from the antenna and that is in the different directions in the space. It may be understood that one or more antenna ports of a beam may also be regarded as an antenna port set. In other words, the antenna port set includes at least one antenna port.

For example, the beam may be a precoding vector that has energy transmission directivity, and the precoding vector can be identified through identification information. The energy transmission directivity means that in a spatial location, a signal precoded through the precoding vector is received at relatively good receive power, for example, power meeting a receive demodulation signal-to-noise ratio; in another spatial location, the signal precoded through the precoding vector is received at relatively low power that does not meet the receive demodulation signal-to-noise ratio. Different communications devices may have different precoding vectors, that is, correspond to different beams. For a configuration or a capability of the communications device, the communications device may use one or more of a plurality of different precoding vectors at a same moment. That is, one or more beams may be formed simultaneously. The beam may be understood as a space resource. The beam may be identified through identification information. Optionally, the identification information may correspond to a corresponding resource identity (ID) configured for the user. For example, the identification information may correspond to an ID or a resource that is configured for a CSI-RS, or correspond to an ID or a resource that is configured for an uplink sounding reference signal (SRS). Alternatively, optionally, the identification information may be identification information explicitly or implicitly carried through a signal or a channel that is carried by the beam. For example, the identification information includes but is not limited to identification information of the beam that is indicated by a synchronization signal or a broadcast channel that is transmitted through the beam, and includes but is not limited to identification information (for example, an SSB index) of the beam that is indicated by a synchronization signal block (SS block, or SSB) transmitted through the beam. The SSB includes at least a primary synchronization signal (PSS) and/or a secondary synchronization signal (SSS) and/or the physical broadcast channel (PBCH).

Figure 2:
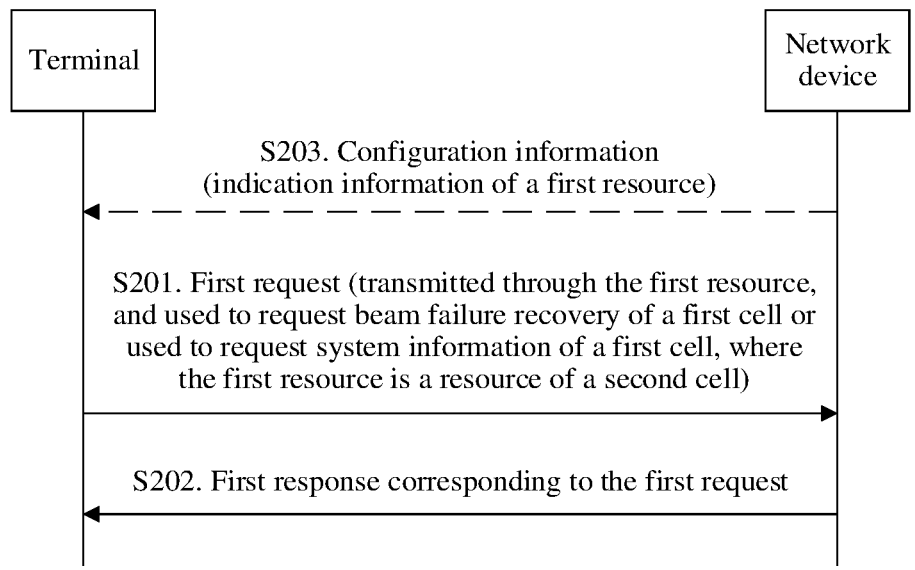
FIG. 2 is a flowchart of a communications method according to an embodiment.

FIG. 2 is a flowchart of a communications method according to an embodiment. As shown in FIG. 2, the method in this embodiment may include the following steps.

In step S201, a terminal transmits a first request to a network device through a first resource.

Correspondingly, the network device receives the first request from the terminal through the first resource.

In step S202, the network device transmits, to the terminal, a first response corresponding to the first request.

Correspondingly, the terminal receives the first response corresponding to the first request from the network device.

In this embodiment, a first cell is a serving cell of the terminal. When BFR of the first cell needs to be performed after a beam of the first cell of the terminal fails, the terminal may transmit the first request to the network device. The first request is used to request BFR of the first cell. Alternatively, when the terminal needs to request system information of the first cell, for example, when the system information of the first cell is updated, the terminal may transmit the first request to the network device. The first request is used to request the system information of the first cell.

Optionally, the beam failure of the first cell may be determined based on quality of a PDCCH of the first cell. The quality of the PDCCH is obtained based on a CSI-RS or an SSB. For example, when the terminal determines, for N consecutive times, that the quality of the PDCCH of the first cell is lower than a preset threshold of the quality of the PDCCH of the first cell, the terminal determines that the beam of the first cell fails. The first cell may be at least one cell. Thresholds of quality of PDCCHs corresponding to different cells are separately configured by the network device. Ns corresponding to different cells are separately configured by the network device, where each N is an integer. A BFRQ process is used to indicate a new SSB or CSI-RS to the network device after the beam failure is determined based on the SSB or the CSI-RS.

The serving cell is a cell that may be used to provide a radio resource for a terminal in a connected mode. If carrier aggregation and/or dual connectivity are/is not configured, the terminal in the connected mode has only one serving cell. If carrier aggregation and/or dual connectivity are/is configured for the terminal in the connected mode, the serving cell is at least one cell, including a primary cell (PCell) and a secondary cell (SCell). The PCell is a cell that works on a primary frequency, a cell in which the terminal may perform an initial connection establishment process or initiate a connection re-establishment process, or a cell that is indicated as a PCell in a handover process. The SCell is a cell working on a secondary frequency, and provides an additional radio resource for the terminal in the connected mode. An activated serving cell is a serving cell that may be used for data transmission. A primary secondary cell (PSCell) is a cell that may initiate contention-based random access (CBFA) when an SCell of a secondary base station changes. A physical uplink control channel (PUCCH) SCell is an SCell for which a PUCCH is configured. The first cell in this embodiment is, for example, a PCell, and a second cell in this embodiment is, for example, an SCell.

In this embodiment, the terminal has a plurality of serving cells, for example, when carrier aggregation and/or dual connectivity are/is configured. Therefore, in this embodiment, the terminal transmits the first request to the network device through the first resource. The first resource is a resource of a serving cell other than the first cell. In this embodiment, the serving cell other than the first cell is referred to as the second cell. For example, the first cell is a low-frequency cell, and the second cell is a high-frequency cell.

In a possible manner, this embodiment may be applied to a scenario in which there are at least two cells. The at least two cells each may be, for example, a cell of one of the following types, or the at least two cells may include cells of at least two of the following types. However, this embodiment is not limited thereto.

Type 1: high-frequency uplink and high-frequency downlink cell. Both an uplink and a downlink of the cell are high-frequency.

Type 2: high-frequency downlink and low-frequency uplink cell. A downlink of the cell is high-frequency, and an uplink is low-frequency.

Type 3: downlink-only (high-frequency or low-frequency) cell. The cell has no uplink, and a downlink of the cell is high-frequency or low-frequency.

Type 4: single-downlink and multi-uplink cell. The cell has one downlink and a plurality of uplinks.

In the scenario in which there are the at least two cells, if one cell is the first cell, other cells are second cells. The at least two cells may provide a service for the terminal through carrier aggregation or dual connectivity.

The first resource includes at least one of the following: a time domain resource, a frequency domain resource, and a space domain resource. The space domain resource may be understood as a beam. The first resource is dedicated, and may be used to uniquely identify the terminal in the second cell. For example, the network device receives the first request through the first resource, and may determine, based on the first resource, that the first request is transmitted by the terminal.

The network device receives the first request from the terminal through the first resource, and then transmits, to the terminal based on the first request, the first response corresponding to the first request. If the first request is used to request BFR of the first cell, the terminal may determine, based on the first response after receiving the first response corresponding to the first request, that BFR of the first cell is completed. If the first request is used to request the system information of the first cell, the terminal may obtain the system information of the first cell from the first response after receiving the first response corresponding to the first request. That is, the first response includes a system information of the first cell.

In this embodiment, the terminal transmits the first request to the network device through the resource of the serving cell other than the first cell. The first request is related to the first cell, and is used to request BFR of the first cell or request the system information of the first cell. Therefore, when the terminal has the plurality of serving cells, the terminal may transmit a request across cells (or across carriers), to improve transmission reliability.

In some embodiments, the method in this embodiment may further include the following step.

In step S203, the network device transmits configuration information to the terminal.

Correspondingly, the terminal receives the configuration information from the network device.

Optionally, the network device may transmit the configuration information to the terminal before the terminal transmits the first request to the network device. The configuration information includes indication information of the first resource. When receiving the indication information, the terminal learns that the first request may be transmitted through the first resource. Then, after receiving the configuration information from the network device, and when needing to transmit the first request, the terminal transmits the first request to the network device through the first resource based on the configuration information.

In this embodiment, the first resource used to transmit the first request is configured by the network device for the terminal. It should be noted that the terminal does not need to receive the configuration information from the network device once each time before transmitting the first request through the first resource.

In some embodiments, the network device further transmits, to the terminal, an association relationship between identification information of at least one beam of the first cell and a part or all of the first resource. For ease of description, the association relationship is referred to as a first association relationship. Correspondingly, the terminal further receives the first association relationship from the network device. Optionally, the first association relationship is included in the configuration information, or may not be included in the configuration information. The first association relationship is, for example, a table used to indicate an association between identification information of a beam and indication information of a resource. This indicates that identification information of each of the at least one beam of the first cell is associated with the part or all of the first resource. Resources (including at least one of the time domain resource, the frequency domain resource, and the space domain resource) that are in the first resource and that are associated with the identification information of the beam may not be completely the same. The identification information of the beam in this embodiment may be identification information of an SSB or identification information of a CSI-RS. The identification information of the beam may be used to identify the beam. The SSB includes at least one of the following: a PSS, an SSS, and a PBCH. Optionally, the identification information of the SSB is an SSB index, and the identification information of the CSI-RS is a resource ID of the CSI-RS. It should be noted that the identification information of the at least one beam is identification information of at least one downlink beam.

It should be noted that the part or all of the first resource that is associated with the identification information of the beam may be a group of resources or a plurality of groups of resources that are associated with the identification information of the beam. If identification information of a first beam is associated with a plurality of groups of resources, the terminal selects one group of resources from the plurality of groups of resources to transmit the first request. Optionally, identification information of a plurality of beams may be associated with a same group of resources.

In some embodiments, a possible implementation of step S201 includes: The terminal transmits the first request to the network device through the first resource based on a first beam of the first cell and the first association relationship, where the first beam is a beam that is of the first cell and whose signal quality meets a preset condition. That is, the terminal determines, in beams of the first cell, a beam whose signal quality meets the preset condition (for example, signal quality is greater than a threshold). For ease of description, the beam is referred to as the first beam herein. Each beam has the identification information for identifying the beam. Therefore, the terminal determines, based on identification information of the first beam and the first association relationship, a part or all of the first resource that is associated with the first beam, and then transmits the first request to the network device through the part or all of the first resource that is determined. It should be noted that, even though a resource actually used to transmit the first request is the part of the first resource, this also falls within the protection scope of transmitting the first request through the first resource. It should be noted that the first beam in the embodiments is a downlink beam.

The signal quality described in the embodiments refers to a parameter used to represent quality of a signal, and may be, for example, reference signal received power (RSRP) or reference signal received quality (RSRQ).

If the terminal determines that there are a plurality of beams whose signal quality meets the preset condition and that are of the first cell, the terminal selects one beam from the plurality of beams whose signal quality meets the preset condition as the first beam.

For example, resources that may be associated with all beams are not completely the same. Some beams are associated with PUCCH resources, some beams are associated with non-contention-based random access (contention free random access, CFRA) CSI-RS resources, some beams are associated with CFRA SSB resources, and some beams are associated with CBFA SSB resources. Priorities of beams vary with different types of associated resources. The priorities of the beams in descending order are: a priority of a beam associated with a PUCCH resource, a priority of a beam associated with a CFRA CSI-RS resource, a priority of a beam associated with a CFRA SSB resource, and a priority of a beam associated with a CBFA SSB resource. In some other embodiments, an order of priorities of beams may include an order of priorities of at least two types of the foregoing beams.

Optionally, a beam with a highest priority may be determined, as the first beam in the foregoing priority order, in the plurality of beams whose signal quality meets the preset condition.

In some embodiments, the network device further transmits an association relationship between the part or all of the first resource and identification information of an uplink frequency band to the terminal. For ease of description, the association relationship is referred to as a second association relationship. Correspondingly, the terminal receives the second association relationship from the network device. Optionally, the second association relationship is included in the configuration information, or may not be included in the configuration information. The second association relationship is, for example, a table used to indicate an association between the identification information of the uplink frequency band and the indication information of the resource. This indicates that uplink frequency bands of the first cell are associated with the part or all of the first resource, and resources that are in the first resource and that are associated with all the uplink frequency bands may not be completely the same. For example, when the second cell has a plurality of uplink frequency bands, an uplink frequency band used to transmit the first request needs to be determined. In this embodiment, each uplink frequency band has corresponding identification information used to identify the uplink frequency band, and the identification information is, for example, an index of the uplink frequency band.

In some embodiments, a possible implementation of step S201 in which the terminal transmits the first request to the network device through the first resource includes: transmitting, by the terminal, the first request to the network device through the first resource based on a first beam of the first cell, the first association relationship, and the second association relationship. For the first beam, refer to the foregoing description. Details are not described herein again. Each beam has identification information for identifying the beam. Therefore, the terminal determines, based on identification information of the first beam and the first association relationship, a part or all of the first resource that is associated with the first beam, then determines, based on the part or all of the first resource that is associated with the first beam and the second association relationship, an identifier of an uplink frequency band associated with the part or all of the first resource that is associated with the first beam, and then transmits the first request to the network device based on the identifier of the uplink frequency band through the part or all of the first resource that is on the uplink frequency band and that is associated with the first beam.

In some embodiments, the first request may be a random access preamble. The random access preamble may be transmitted through a physical random access channel (PRACH). Alternatively, the first request may be uplink control information. The uplink control information may be transmitted through a PUCCH. Optionally, when receiving the random access preamble or the uplink control information through the first resource, the network device may determine that the random access preamble or the uplink control information is transmitted by the terminal, or may determine that the random access preamble or the uplink control information is used to request BFR of the first cell or used to request the system information of the first cell.

In some embodiments, the network device further transmits an association relationship between the identification information of the at least one beam of the first cell and the random access preamble to the terminal. For description of the solution, the association relationship herein is referred to as a third association relationship. Correspondingly, the terminal receives the third association relationship from the network device. Optionally, the third association relationship is included in the configuration information, or may not be included in the configuration information. The third association relationship is, for example, a table used to indicate an association between the identification information of the at least one beam and the random access preamble. This indicates that the beam of the first cell is associated with the random access preamble. Optionally, a manner in which the terminal transmits the first request to the network device through the first resource is as follows: The terminal transmits a random access preamble to the network device through the first resource, where the random access preamble is determined based on the first beam and the third association relationship.

In some embodiments, a possible implementation of step S202 in which the network device transmits the first response to the terminal may include: transmitting, by the network device, the first response to the terminal based on a transmission parameter of the first response.

Optionally, the transmission parameter of the first response may be determined based on the part or all of the first resource for receiving the first request and the first association relationship. In this embodiment, after receiving the first request, the network device may determine resources on which the first request is received, for example, the part or all of the first resource. Because there is the first association relationship, the first beam associated with the part or all of the first resource for receiving the first request is determined based on the part or all of the first resource for receiving the first request and the first association relationship. If the first request is used to request BFR of the first cell, the network device may use the first beam as a serving beam of the first cell. After determining the first beam, the network device determines the transmission parameter of the first response based on a transmission parameter of the first beam, and then transmits the first response to the terminal based on the transmission parameter of the first response. The serving beam may be understood as that the beam is used to transmit downlink control information (DCI).

The transmission parameter includes at least one of the following: an angle of departure, an average angle of departure (AoD), an angle power spectrum of the angle of departure (PAS of AoD), a transmit/receive channel correlation, transmit/receive beamforming, and a spatial channel correlation.

Correspondingly, a possible implementation of step S202 in which the terminal receives the first response from the network device may include: receiving, by the terminal, the first response from the network device based on a reception parameter of the first response, where the reception parameter of the first response is determined based on a reception parameter of the first beam. In this embodiment, the terminal may determine the reception parameter of the first response based on the reception parameter of the first beam. For example, the reception parameter of the first response is the same as the reception parameter of the first beam. For example, when the terminal receives a physical downlink shared channel (PDSCH) for transmitting the first response, the terminal may determine that a reception parameter of a DMRS of the PDSCH is determined based on the reception parameter of the first beam. The reception parameter includes at least one of the following: an average gain, an average delay, a delay spread, a doppler shift, a doppler spread, an angle of arrival (AoA), an average angle of arrival (average AoA), a dominant angle of arrival (Dominant AoA), an angle power spectrum of the angle of arrival (PAS of AoA), an average AoD, a PAS of AoD, a transmit/receive channel correlation, transmit/receive beamforming, and a spatial channel correlation.

In some embodiments, if the terminal has not received, within preset duration after transmitting the first request, the first response that corresponds to the first request and that is transmitted by the network device, the terminal may transmit the first request to the network device again through the first resource. Optionally, the terminal in the embodiments may further record a quantity of instances of transmitting the first request. If the quantity of the instances of transmitting the first request is greater than or equal to a preset quantity of instances, and the terminal still does not receive the first response corresponding to the first request, the terminal may consider that BFR of the first cell fails or the terminal fails to request the system information of the first cell.

In some embodiments, the network device may transmit, to the terminal through the first cell, the first response corresponding to the first request. Correspondingly, the terminal receives, from the network device through the first cell, the first response corresponding to the first request. In some embodiments, the first response is a PDCCH scrambled by using a C-RNTI, or the first response is a random access response. In the embodiments, the terminal receives a PDCCH scrambled by using a C-RNTI or a random access response, and determines whether the PDCCH scrambled by using the C-RNTI or the random access response is received through the first cell. If the PDCCH scrambled by using the C-RNTI or the random access response is received through the first cell, the terminal determines that the PDCCH scrambled by using the C-RNTI or the random access response is the first response corresponding to the first request; otherwise, it indicates that the terminal has not received the first response corresponding to the first request.

In a possible implementation, the first response is a PDCCH scrambled by using a C-RNTI (the C-RNTI is used to identify the terminal). The PDCCH scrambled by using the C-RNTI may be understood as that a cyclical redundancy check (CRC) of DCI transmitted through the PDCCH is scrambled by using the C-RNTI. The CRC may be used to determine whether an information bit of the DCI is successfully decoded. The DCI may be a downlink assignment or an uplink grant. The downlink assignment is used to allocate a downlink resource, and the uplink grant is used to allocate an uplink resource. For example, if the terminal receives, through the reception parameter of the first response, the DCI from a dedicated control resource set (CORESET) that is configured by the network device and that is used to receive a response message, the terminal may determine that a BFR process is completed. The dedicated CORESET may be used to transmit dedicated DCI, for example, transmit the DCI scrambled by using the C-RNTI. The dedicated CORESET may include, for example, at least one of the following: a frequency domain resource, a start symbol, duration, a period, an interleaving indication, and a DMRS scrambling ID. Optionally, the dedicated CORESET used to receive the first response is associated with the identification information of the first beam. In some other embodiments, for the description about the first response in this implementation, the corresponding first request may be transmitted by the terminal to the network device through the first cell.

In another possible implementation, the first request is a CFRA preamble. Correspondingly, the first response is a random access response. In a CFRA process, the random access response includes only a subheader, and the subheader includes a field of an identifier of the random access preamble. If the terminal receives, by using a corresponding random access radio network temporary identifier (RA-RNTI), the random access response that carries the identifier of the random access preamble (that is, the first request), the terminal determines that random access is completed, and determines that a BFR process of the first cell is completed.

In another possible implementation, the first request is a CBFA preamble (a Msg 1). In a CBFA process, a random access response message corresponding to the random access preamble includes a subheader, where the subheader includes a field of an identifier of the random access preamble, and further includes an uplink grant. Optionally, the random access response message may further include a timing advance indication and a temporary C-RNTI. The terminal receives a random access response (a Msg 2) transmitted by the network device. If the first request is used to request BFR of the first cell, the terminal further transmits first data (for example, a Msg3) to the network device through the second cell based on the random access response. The first data includes the C-RNTI. Then the terminal receives second data (for example, a Msg4) from the network device through the first cell. The second data is a PDCCH scrambled by using the C-RNTI, and may be a downlink assignment or an uplink grant. The second data is used for contention resolution. After receiving the second data, the terminal may determine that random access is completed, determine that a BFR process of the first cell is completed, and no longer transmit the first request to the network device. If the first request is used to request the system information of the first cell, the terminal transmits the first data (for example, the Msg3) to the network device through the first cell based on the random access response. The first data includes the C-RNTI and a type of the requested system information. Then the terminal receives the second data through the first cell. The second data is the PDCCH scrambled by using the C-RNTI, and may be the downlink assignment or the uplink grant. The second data is used for contention resolution. After receiving the random access response and the second data, the terminal may determine that random access is completed, and obtain the system information of the first cell.

In some embodiments, the network device transmits the first response to the terminal through the serving cell of the terminal that is other than the first cell. Correspondingly, the terminal receives the first response from the network device through the serving cell other than the first cell. The first response includes identification information of the first cell. The terminal in the embodiments may determine, based on the identification information of the first cell that is in the first response, that the first response is the first response corresponding to the first request, thereby determining that a BFR process of the first cell is completed or determining that the system information of the first cell is obtained. The identification information of the first cell may be carried in a reserved field of DCI. A bit of the reserved field is used to indicate the identification information of the first cell. For example, "00" corresponds to a cell 1, and "01" corresponds to a cell 2. The correspondence may be configured by the network device or pre-specified in a protocol.

Optionally, in a solution in which the first request is a random access preamble, in a carrier aggregation-configured scenario, a priority of random access performed through a PCell is higher than that of random access performed through an SCell. In a dual connectivity-configured scenario, a priority of random access performed through a PCell in a PCell group is higher than that of random access performed through an SCell in the PCell group. A priority of random access performed through a PSCell in a SCell group is higher than that of random access performed through an SCell in the SCell group. If random access is triggered through an SCell (for example, BFR is needed or the system information needs to be requested), and random access is also triggered through a PCell (for example, uplink data arrives, but uplink out-of-synchronization occurs, or downlink data arrives, but uplink out-of-synchronization occurs), the terminal performs the random access triggered through the PCell. If the terminal is performing random access through the PCell, and random access is triggered through the SCell, the terminal continues the random access performed through the PCell. If the terminal is performing random access performed through the SCell, and random access is triggered through the PCell, the terminal stops the random access performed through the SCell, and starts the random access performed through the PCell.

The configuration information may be, for example, a radio resource control (RRC) message.

Figure 3:
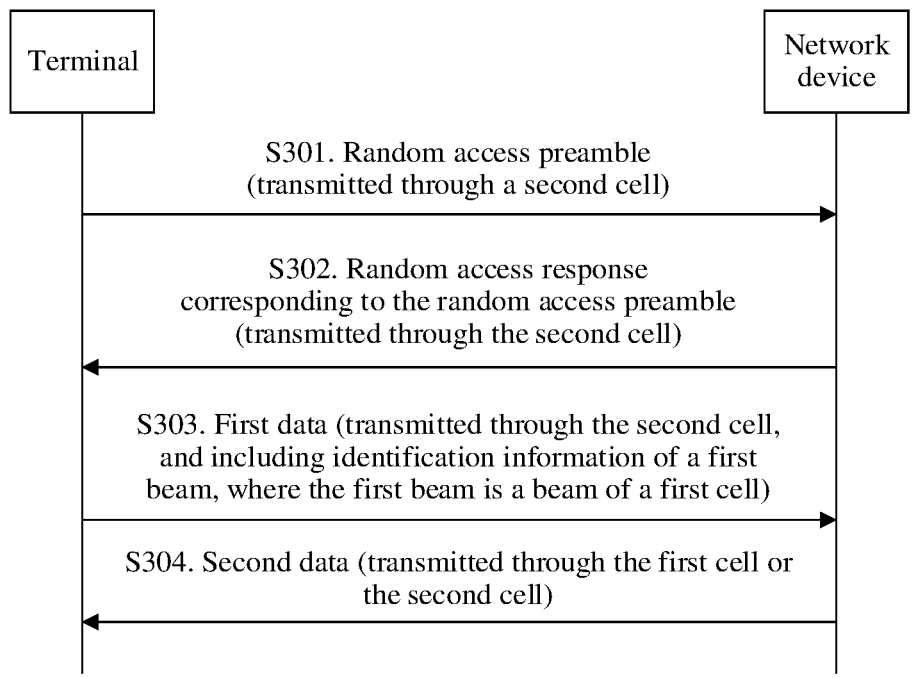
FIG. 3 is a flowchart of a communications method according to another embodiment.

FIG. 3 is a flowchart of a communications method according to another embodiment. As shown in FIG. 3, the method in this embodiment may include the following steps.

In step S301, a terminal transmits a random access preamble to a network device through a second cell. Correspondingly, the network device receives the random access preamble from the terminal through the second cell.

In this embodiment, when BFR of a first cell needs to be performed after a beam of the first cell of the terminal fails, the terminal may request BFR of the first cell from the network device; or when the terminal needs to request system information of the first cell, for example, when the system information of the first cell is updated, the terminal may request the system information of the first cell from the network device. In this embodiment, the terminal initiates random access through the second cell to request BFR or the system information from the network device, where the random access is CBFA. It should be noted that descriptions about the first cell and the second cell in the foregoing embodiments are also applicable to this embodiment. Details are not described herein again.

Optionally, the terminal in this embodiment further receives configuration information for random access from the network device, where the configuration information for the random access is used in a random access process.

Optionally, there is an association relationship between a resource for the random access preamble and identification information of a downlink beam of the second cell. The downlink beam may be replaced with an SSB or a CSI-RS.

In step S302, the network device transmits, to the terminal through the second cell, a random access response corresponding to the random access preamble. Correspondingly, the terminal receives the random access response from the network device through the second cell.

Optionally, the terminal device determines a downlink beam of the second cell, and transmits the random access preamble to the network device through a resource of the random access preamble that corresponds to the downlink beam.

In this embodiment, the random access response includes an uplink grant. Optionally, the random access response may further include at least one of the following: a timing advance indication and a temporary C-RNTI.

In step S303, the terminal transmits first data to the network device through the second cell based on the random access response.

Correspondingly, the network device receives the first data from the terminal through the second cell.

In this embodiment, after receiving the random access response, the terminal transmits first data (for example, a Msg3) to the network device through the second cell. The first data includes a C-RNTI of the terminal (that is, the C-RNTI may be other than the foregoing temporary C-RNTI). In this embodiment, the terminal requests BFR of the first cell or requests the system information of the first cell. Therefore, the first data further includes identification information of a first beam. The first beam is a beam that is of the first cell and whose signal quality meets a preset condition. For related descriptions of the first beam, refer to related descriptions in the foregoing embodiments. Details are not described herein again. The identification information of the first beam may be identification information of an SSB and/or identification information of a CSI-RS. The identification information of the SSB is, for example, identification information of the first cell and an SSB index, and the identification information of the CSI-RS is, for example, the identification information of the first cell and a CSI-RS ID. Optionally, the first data may be transmitted through a medium-access-control control element (MAC CE). A first field of the MAC CE is used to indicate whether there is the identification information of the first beam of the first cell. A second field is used to indicate identification information of the beam of the first cell (for example, identification information of an SSB of the first cell and/or identification information of a CSI-RS of the first cell). The first field is a reserved field. For example, a bit of the first field being "1" indicates that there is the second field, and the bit of the first field being "0" indicates that there is no second field. The CSI-RS ID is used to identify at least one CSI-RS resource. The SSB index is used to identify the SSB. An identifier of the first beam is used for BFR. It should be noted that the CSI-RS ID may be a CSI-RS configuration ID or a CSI-RS resource ID, and is used to identify a group of configurations. The configurations include at least one group of CSI-RS resources. It should be noted that the first cell may be at least one cell in which a beam failure occurs.

In step S304, the network device transmits second data to the terminal through the first cell or the second cell.

Correspondingly, the terminal receives the second data from the network device through the first cell or the second cell.

In this embodiment, the network device receives the first data, and determines, based on the identifier of the first beam that is in the first data, that the terminal requests BFR. That is, the first beam is used as a serving beam. The network device transmits the second data (for example, an Msg4) to the terminal through the first cell or the second cell. The second data is a PDCCH scrambled by using a C-RNTI. After transmitting all of the first data, the terminal receives, through the first cell or the second cell, the PDCCH scrambled by using the C-RNTI, and determines that a BFR process of the first cell is completed or the system information of the first cell is obtained. Optionally, the terminal further determines, based on the second data, that random access is completed. The second data is used for contention resolution.

Optionally, the network device determines a transmission parameter of a PDCCH of the first cell based on the first beam (the SSB and/or the CSI-RS that correspond/corresponds to the beam), and then transmits the second data to the terminal through the first cell based on the transmission parameter of the PDCCH.

Optionally, the terminal receives the second data (for example, the PDCCH scrambled by using the C-RNTI) from the network device through the first cell based on a reception parameter of the first beam, or the terminal receives the second data (for example, the PDCCH scrambled by using the C-RNTI) from the network device through a dedicated CORESET of the first cell based on a reception parameter of the first beam, where the dedicated CORESET is used to transmit dedicated DCI (for example, the dedicated CORESET may be used to transmit DCI scrambled by using a C-RNTI). For example, a reception parameter of the second data is the same as the reception parameter of the first beam. For description of the reception parameter, refer to related descriptions in the foregoing embodiments. Details are not described herein again.

Optionally, the network device determines a transmission parameter of a PDCCH of the second cell based on a transmission parameter that is of a downlink beam (an SSB and/or a CSI-RS corresponding to the beam) of the second cell and that corresponds to a resource for receiving the random access preamble, and then transmits the second data to the terminal through the second cell based on the transmission parameter of the PDCCH.

Optionally, the terminal receives the second data from the network device through the second cell based on a reception parameter of a downlink beam corresponding to a resource for transmitting the random access preamble. For example, the reception parameter of the second data is the same as the reception parameter of the downlink beam corresponding to the resource for transmitting the random access preamble. For description of the reception parameter, refer to related descriptions in the foregoing embodiments. Details are not described herein again.

In this embodiment, when the beam of the first cell fails, the terminal transmits the random access preamble to the network device through the second cell, then receives the random access response from the network device through the second cell, and then transmits the Msg3 to the network device based on the random access response. The Msg3 includes an identifier of the beam of the first cell, to request BFR or request the system information of the first cell. In this embodiment, BFR or the system information of the first cell is requested by performing the CBFA across cells (or across carriers) manner, so that transmission reliability can be improved.

Optionally, the embodiment corresponding to FIG. 2 and the embodiment corresponding to FIG. 3 may be independent of each other, or may be associated with each other. For example, after determining that the beam failure occurs in the first cell, the terminal may first determine whether the first beam has a corresponding PUCCH resource and/or a CFRA resource, that is, whether there is a PUCCH resource used to transmit the first request (uplink control information) or a CFRA resource used to transmit the first request (a CFRA preamble). If there is the PUCCH resource or the CFRA resource, the terminal may transmit the first request through the PUCCH resource or the CFRA resource, to perform the embodiment corresponding to FIG. 2. If there is no PUCCH resource or CFRA resource, and there is a PUSCH resource, the terminal generates a MAC CE, used to indicate the identification information of the first beam of the first cell. The MAC CE is equivalent to a function of a first request in the embodiment shown in FIG. 3. After receiving the MAC CE, the network device transmits an acknowledgment response to the terminal, to instruct the terminal to receive DCI from the network device based on the reception parameter of the first beam. If there is no PUSCH resource, the embodiment corresponding to FIG. 3 is performed.

Figure 4:
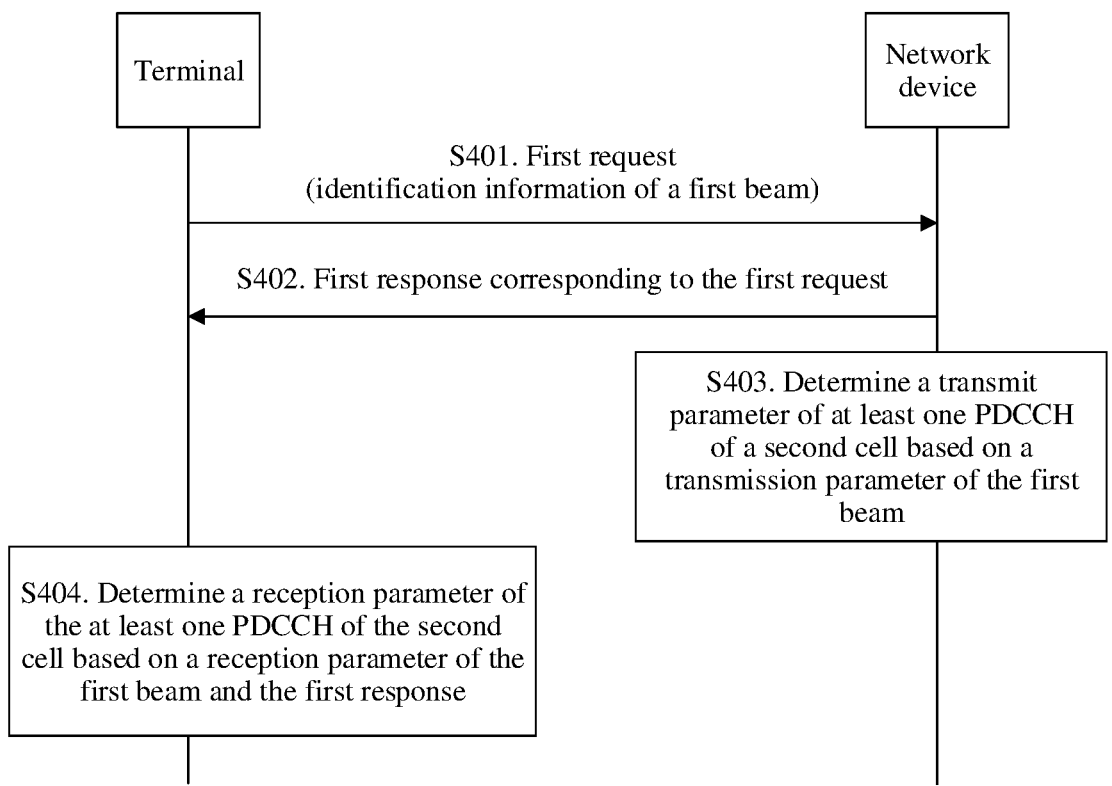
FIG. 4 is a flowchart of a communications method according to another embodiment.

FIG. 4 is a flowchart of a communications method according to another embodiment. As shown in FIG. 4, the method in this embodiment may include the following steps.

In step S401, a terminal transmits a first request to a network device.

Correspondingly, the network device receives the first request from the terminal.

This embodiment may be applied to a scenario in which the terminal has a plurality of serving cells, for example, a first cell and at least one second cell. The first cell is a cell having an SSB or a CSI-RS, and the second cell is a cell having no SSB or CSI-RS. Synchronization of the second cell is based on the SSB or the CSI-RS of the first cell. It should be noted that an application scenario of this embodiment is not limited thereto.

When the terminal determines that a beam failure occurs, and there are beams whose signal quality meets a preset condition in beams of the first cell, the terminal may select a beam from the beams to request BFR. For ease of description, the selected beam is referred to as a first beam. For descriptions of the first beam, refer to the descriptions in the foregoing embodiments. Details are not described herein again. The terminal in this embodiment transmits the first request to the network device. The first request includes identification information of the first beam of the first cell. The first request is used to request to use the first beam as a serving beam of the first cell.

In some embodiments, the first request is a random access preamble, or the first request is uplink control information.

In step S402, the network device transmits, to the terminal, a first response corresponding to the first request. Correspondingly, the terminal receives the first response corresponding to the first request from the network device.

In step S403, the network device determines a transmission parameter of at least one PDCCH of the second cell based on a transmission parameter of the first beam.

Optionally, the transmission parameter of the PDCCH includes a transmission parameter of a DMRS of the PDCCH.

In step S404, the terminal determines a reception parameter of the at least one PDCCH of the second cell based on a reception parameter of the first beam and the first response.

Optionally, the reception parameter of the PDCCH includes a reception parameter of the DMRS of the PDCCH.

An execution sequence among steps S403, S402, and S404 is not limited in this embodiment.

In this embodiment, the network device determines the transmission parameter of the at least one PDCCH of the second cell based on the transmission parameter of the first beam. For example, the transmission parameter of the PDCCH is the same as the transmission parameter of the first beam. Correspondingly, the terminal determines, based on the received first response corresponding to the first request, that a BFR process is completed. Then, the terminal determines the reception parameter of the at least one PDCCH of the second cell based on the reception parameter of the first beam and the first response. For example, the reception parameter of the PDCCH is the same as the reception parameter of the first beam. For descriptions of the reception parameter, refer to the foregoing embodiments. Details are not described herein again. The synchronization of the second cell may be based on the SSB or the CSI-RS of the first cell. It should be noted that there may be at least one second cell.

In some embodiments, the network device transmits DCI to the terminal based on the transmission parameter of the PDCCH. Correspondingly, the terminal receives the DCI from the network device based on the determined reception parameter of the PDCCH.

In a possible implementation, the first response includes identification information of the at least one PDCCH of the second cell, for example, identification information of a DMRS port of the PDCCH or identification information of the DMRS of the PDCCH. Optionally, the network device determines a transmission parameter of at least one PDCCH based on the transmission parameter of the first beam, and the first response includes identification information of the at least one PDCCH whose transmission parameter is determined by the network device. Alternatively, the first response includes identification information of at least one PDCCH, and the network device determines, based on the transmission parameter of the first beam, a transmission parameter of the at least one PDCCH identified by the at least one piece of identification information. The terminal determines, based on the at least one piece of identification information in the first response and the reception parameter of the first beam, a reception parameter of the at least one PDCCH identified by the at least one piece of identification information. It should be noted that the first response may include identification information of some PDCCHs of the second cell, or the first response may include identification information of all PDCCHs of the second cell.

In another possible implementation, the first response does not include identification information of the PDCCH of the second cell. Correspondingly, the network device determines the transmission parameter of the PDCCH of the second cell based on the transmission parameter of the first beam. The terminal determines the reception parameter of the PDCCH of the second cell based on the reception parameter of the first beam. It should be noted that the second cell may be all serving cells that need to be synchronized based on the beam of the first cell and that are other than the first cell, and the PDCCH may be all PDCCHs of the second cell.

In some embodiments, the terminal transmits the first request to the network device through a resource associated with the first beam. The resource associated with the first beam belongs to the first cell, the resource associated with the first beam belongs to another serving cell other than the first cell, or the resource associated with the first beam belongs to the first cell and another serving cell other than the first cell. The another serving cell may be at least one cell, or may be all serving cells other than the first cell.

In some embodiments, the network device may transmit the first response to the terminal through the first cell or any serving cell other than the first cell.

In some embodiments, the first response may be a MAC CE.

In this embodiment, according to the foregoing solution, even though the beam of the first cell fails, a reception parameter of a PDCCH (for example, a reception parameter of a DMRS of the PDCCH) of another cell other than the first cell can be determined.

Figure 5:
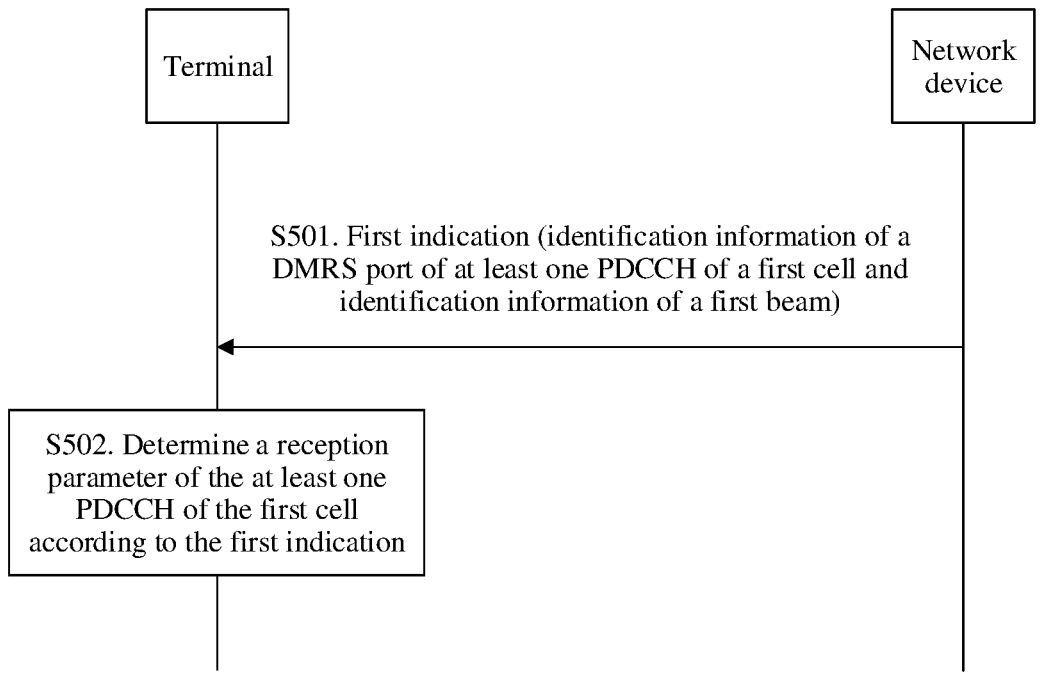
FIG. 5 is a flowchart of a communications method according to another embodiment.

FIG. 5 is a flowchart of a communications method according to another embodiment. As shown in FIG. 5, the method in this embodiment may include the following steps.

In step S501, a network device transmits a first indication to a terminal. Correspondingly, the terminal receives the first indication from the network device.

In this embodiment, the first indication is used to indicate information about a reception parameter of at least one PDCCH of a first cell. The first cell has no SSB or CSI-RS. Synchronization of the first cell is based on an SSB or a CSI-RS of another cell.

Optionally, the first indication is, for example, a MAC CE.

In step S502, the terminal determines the reception parameter of the at least one PDCCH of the first cell according to the first indication.

In this embodiment, the terminal determines the reception parameter of the at least one PDCCH of the first cell according to the first indication.

Optionally, the reception parameter of the PDCCH may include a reception parameter of a DMRS of the PDCCH.

In some embodiments, before transmitting the first indication to the terminal, the network device determines a transmission parameter of the at least one PDCCH of the first cell.

In some embodiments, the first indication includes identification information of the at least one PDCCH of the first cell (for example, identification information of a DMRS port of the PDCCH or identification information of a DMRS of the PDCCH) and identification information of a beam of a second cell. Correspondingly, the terminal determines the reception parameter of the at least one PDCCH of the first cell based on the first indication and a reception parameter of the beam of the second cell. In this embodiment, the terminal determines the reception parameter of the beam of the second cell based on the identification information of the beam of the second cell in the first indication, and then determines, based on the reception parameter of the beam, the reception parameter of the at least one PDCCH identified by the identification information of the at least one PDCCH. In addition, the network device determines, based on a transmission parameter of the beam of the second cell, the transmission parameter of the at least one PDCCH identified by the identification information of the at least one PDCCH. After the network device determines the transmission parameter and the terminal determines the reception parameter, the network device transmits DCI to the terminal through the first cell. Correspondingly, the terminal receives the DCI from the network device through the first cell. The DCI is a downlink assignment or an uplink grant.

The identification information of the DMRS port includes, for example, a cell index of the first cell and a DMRS port index/identifier. The identification information of the beam of the second cell includes, for example, a cell index of the second cell and a beam (for example, an SSB) index.

In this embodiment, according to the foregoing solution, when a cell has no SSB or CSI-RS, a reception parameter of a PDCCH (for example, a reception parameter of a DMRS of the PDCCH) of the cell may also be determined.

A communications method provided in another embodiment includes the following steps:

In step A, after finding, through detection, that a beam failure of a serving cell occurs, L1 (that is, a physical layer) of a terminal transmits a beam failure indication of the serving cell to L2 (a media access control layer) of the terminal.

In step B, L2 of the terminal starts a first timer after receiving the beam failure indication, and optionally, further starts a second timer. When either of the first timer and the second timer expires, L2 exits a BFR process, and indicates a BFR failure to L3 (an RRC layer). If the serving cell in which the BFR failure currently occurs is an SCell, the terminal transmits a BFR failure report to a network device, to deactivate the SCell. The first timer is configured to control duration of the BFR process, and the second timer is configured to control a time for monitoring a candidate beam.

In step C, optionally, during running of the second timer, the terminal identifies the candidate beam (the beam is a downlink beam, and may be associated with a PUCCH resource, a CBFA resource, and a CFRA resource that are used to transmit a BFRQ, until at least one candidate (a RSRP≥a threshold) is identified, and the terminal selects a beam (referred to as a first beam) from the at least one candidate beam, where the beam is used to transmit a BFRQ. Optionally, resources that may be associated with all beams are not completely the same. Some beams are associated with PUCCH resources, some beams are associated with CFRA) CSI-RS resources, some beams are associated with CFRA SSB resources, and some beams are associated with CBFA SSB resources. Priorities of beams vary with different types of associated resources. The terminal device determines a beam based on a preset priority. The priorities of the beams in descending order are: a priority of a beam associated with a PUCCH resource, a priority of a beam associated with a CFRA CSI-RS resource, a priority of a beam associated with a CFRA SSB resource, and a priority of a beam associated with a CBFA SSB resource. Therefore, a beam with a highest priority may be determined in the at least one candidate beam in the foregoing priority order, and is used to transmit the BFRQ. It should be noted that a beam priority order only needs to include an order of priorities of any two of the foregoing beams. If a descending order of beam priorities includes an order of priorities of two beams, for example, the beam associated with the PUCCH resource and the beam associated with the CFRA SSB resource. This is not limited in this embodiment.

After selecting the beam, the terminal determines whether there is a valid PUCCH resource used for BFRQ transmission in the selected beam. If there is the valid PUCCH resource used for BFRQ transmission, the terminal transmits a BFRQ of a PUCCH through the PUCCH resource, adds 1 to a count on times of transmitting the BFRQ of the PUCCH, and monitors, within preset duration, a PDCCH scrambled by using a C-RNTI. If there is no valid PUCCH resource used for BFRQ transmission, the terminal further determines whether a CFRA resource is configured for the selected beam, where the CFRA resource is used to transmit a BFRQ of a CFRA. If the CFRA resource is configured, the terminal transmits the BFRQ of the CFRA by using the CFRA resource, adds 1 to a count on times of transmitting the BFRQ of the CFRA, and monitors, within preset duration, a PDCCH scrambled by using a C-RNTI. If no CFRA resource is configured, the terminal determines whether there is a PUSCH resource at this time. If there is the PUSCH resource, the terminal generates a MAC CE or physical layer signaling, indicates identification information of the first beam to the network device, where the identification information is used for BFR, and stops transmitting the BFRQ of the PUCCH, the BFRQ of the CFRA, or a BFRQ of a CBRA to the network device. If there is no PUSCH resource, the terminal transmits a BFRQ of a CBRA by using a CBRA resource, adds 1 to a count on times of transmitting the BFRQ of the CBRA, and continues to perform a subsequent base station-based random access process.

If L1 of the terminal monitors, within preset duration, a PDCCH scrambled by using a C-RNTI, L1 instructs L2 to exit the BFR process; otherwise, L2 determines whether a maximum quantity of instances of transmitting a BFRQ is reached. If the maximum quantity of instances of transmitting the BFRQ is reached, L2 exits the BFR procedure and indicates the BFR failure to L3.

It may be understood that in the foregoing embodiments, the methods or the steps implemented by the terminal may alternatively be implemented by a chip applicable to the terminal. The methods or the steps implemented by the network device may alternatively be implemented by a chip applicable to the network device.

Figure 6:
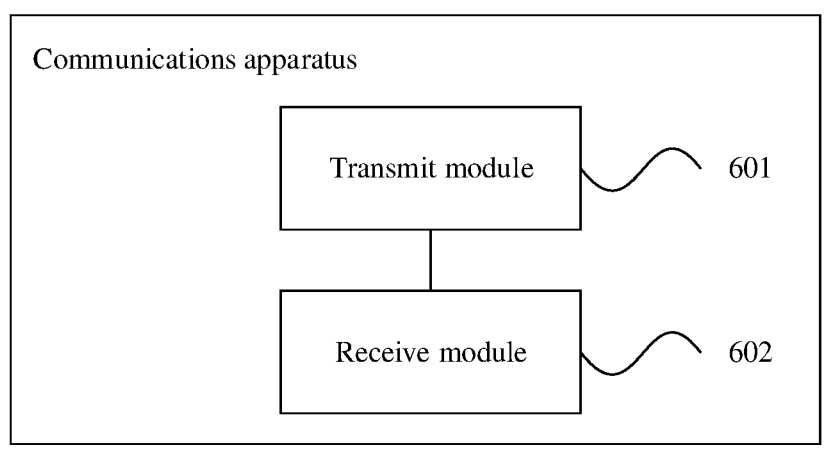
FIG. 6 is a schematic structural diagram of a communications apparatus according to an embodiment.

An embodiment provides a communications apparatus. The communications apparatus may be a terminal, or may be a chip applicable to a terminal. As shown in FIG. 6, the communications apparatus in this embodiment may include a transmit module 601 and a receive module 602.

The transmit module 601 is configured to transmit a first request to a network device through a first resource, where the first request is used to request BFR of a first cell or is used to request system information of the first cell, the first resource is a resource of a second cell, and the first cell and the second cell are serving cells of a same terminal.

The receive module 602 is configured to receive, from the network device, a first response corresponding to the first request.

In some embodiments, the receive module 602 is further configured to receive configuration information from the network device, where the configuration information includes indication information of the first resource.

The transmit module 601 is configured to transmit the first request to the network device through the first resource based on the indication information of the first resource that is in the configuration information.

In some embodiments, the receive module 602 is further configured to receive, from the network device, a first association relationship between identification information of at least one beam of the first cell and a part or all of the first resource.

The transmit module 601 is configured to transmit the first request to the network device through the first resource based on a first beam of the first cell and the first association relationship, where the first beam is a beam that is of the first cell and whose signal quality meets a preset condition.

In some embodiments, the receive module 602 is further configured to receive, from the network device, a second association relationship between the part or all of the first resource and identification information of an uplink frequency band.

The transmit module 601 is configured to transmit the first request to the network device through the first resource based on the first beam, the first association relationship, and the second association relationship.

In some embodiments, the receive module 602 is configured to receive the first response from the network device based on a reception parameter of the first response, where the reception parameter of the first response is determined based on a reception parameter of the first beam.

In some embodiments, the first request is a random access preamble or uplink control information.

In some embodiments, the receive module 602 is configured to receive the first response from the network device through the first cell.

In some embodiments, the first response is a PDCCH scrambled by using a C-RNTI, or the first response is a random access response.

In some embodiments, the receive module 602 is configured to receive the first response from the network device through a serving cell different from the first cell, where the first response includes identification information of the first cell.

In some embodiments, the first request further includes identification information of the first beam, and the first beam is the beam that is of the first cell and whose signal quality meets the preset condition.

In some embodiments, the first request further includes the identification information of the first cell.

In some embodiments, the transmit module 601 is further configured to transmit a random access preamble to the network device through the second cell before transmitting the first request to the network device through the first resource.

The receive module 602 is further configured to receive, from the network device through the second cell, a random access response corresponding to the random access preamble.

When transmitting the first request to the network device through the first resource, the transmit module 601 is configured to transmit the first request to the network device through the second cell based on the random access response.

When receiving the first response corresponding to the first request from the network device, the receive module 602 is configured to receive, from the network device through the second cell, the first response corresponding to the first request, where the first response is the PDCCH scrambled by using the C-RNTI.

In some embodiments, the receive module 602 is configured to receive, from the network device through the second cell based on the reception parameter of the first response, the first response corresponding to the first request, where the reception parameter of the first response is determined based on the reception parameter of the first beam.

The communications apparatus in this embodiment may be configured to perform the technical solutions performed by the terminal/the chip of the terminal in the corresponding method embodiments. Implementation principles and technical effects of the communications apparatus are similar to those in the method embodiments. For functions of the modules, refer to corresponding descriptions in the method embodiments. Details are not described again herein.

Figure 7:
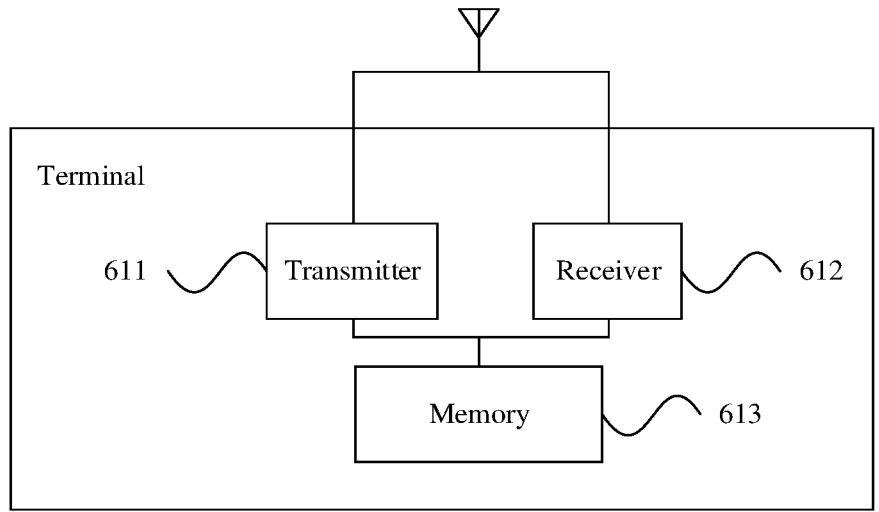
FIG. 7 is a schematic structural diagram of a terminal according to an embodiment.

FIG. 7 is a schematic structural diagram of a terminal according to an embodiment. As shown in FIG. 7, the terminal in this embodiment may include a transmitter 611 and a receiver 612. In terms of hardware implementation, the transmit module 601 may be the transmitter 611 in this embodiment, and the receive module 602 may be the receiver 612 in this embodiment. In addition, the transmitter 611 and the receiver 612 may be combined into a transceiver.

The transmitter 611 is configured to transmit a first request to a network device through a first resource, where the first request is used to request BFR of a first cell or is used to request system information of the first cell, the first resource is a resource of a second cell, and the first cell and the second cell are serving cells of the same terminal.

The receiver 612 is configured to receive, from the network device, a first response corresponding to the first request.

In some embodiments, the receiver 612 is further configured to receive configuration information from the network device, where the configuration information includes indication information of the first resource.

The transmitter 611 is configured to transmit the first request to the network device through the first resource based on the indication information of the first resource that is in the configuration information.

In some embodiments, the receiver 612 is further configured to receive, from the network device, a first association relationship between identification information of at least one beam of the first cell and a part or all of the first resource.

The transmitter 611 is configured to transmit the first request to the network device through the first resource based on a first beam of the first cell and the first association relationship, where the first beam is a beam that is of the first cell and whose signal quality meets a preset condition.

In some embodiments, the receiver 612 is further configured to receive, from the network device, a second association relationship between the part or all of the first resource and identification information of an uplink frequency band.

The transmitter 611 is configured to transmit the first request to the network device through the first resource based on the first beam, the first association relationship, and the second association relationship.

In some embodiments, the receiver 612 is configured to receive the first response from the network device based on a reception parameter of the first response, where the reception parameter of the first response is determined based on a reception parameter of the first beam.

In some embodiments, the first request is a random access preamble or uplink control information.

In some embodiments, the receiver 612 is configured to receive the first response from the network device through the first cell.

In some embodiments, the first response is a PDCCH scrambled by using a C-RNTI, or the first response is a random access response.

In some embodiments, the receiver 612 is configured to receive the first response from the network device through a serving cell different from the first cell, where the first response includes identification information of the first cell.

In some embodiments, the first request further includes identification information of the first beam, and the first beam is the beam that is of the first cell and whose signal quality meets the preset condition.

In some embodiments, the first request further includes the identification information of the first cell.

In some embodiments, the transmitter 611 is further configured to transmit a random access preamble to the network device through the second cell before transmitting the first request to the network device through the first resource.

The receiver 612 is further configured to receive, from the network device through the second cell, a random access response corresponding to the random access preamble.

When transmitting the first request to the network device through the first resource, the transmitter 611 is configured to transmit the first request to the network device through the second cell based on the random access response.

When receiving the first response corresponding to the first request from the network device, the receiver 612 is configured to receive, from the network device through the second cell, the first response corresponding to the first request, where the first response is the PDCCH scrambled by using the C-RNTI.

In some embodiments, the receiver 612 is configured to receive, from the network device through the second cell based on the reception parameter of the first response, the first response corresponding to the first request, where the reception parameter of the first response is determined based on the reception parameter of the first beam.

Optionally, the terminal in this embodiment may further include a memory 613. The memory 613 is configured to store a program instruction. The transmitter 611 and the receiver 612 invoke the program instruction in the memory 613 to perform the foregoing solutions.

The program instruction may be implemented in a form of a software functional unit and can be sold or used as an independent product. The memory 613 may be a computer-readable storage medium in any form. Based on such an understanding, all or some of the technical solutions in the embodiments may be represented in a form of a software product. The software product includes several instructions for instructing a computer device, which may be a processor, to perform all or some of the steps of the terminal in the embodiments. The computer readable storage medium includes: any medium that can store program code, such as a USB flash drive, a removable hard disk, a read-only memory (ROM), a random access memory (RAM), a magnetic disk, or an optical disc.

The terminal in this embodiment may be configured to perform the technical solutions performed by the terminal/the chip of the terminal in the corresponding method embodiments. Implementation principles and technical effects of the terminal are similar to those in the method embodiments. For functions of the modules, refer to corresponding descriptions in the method embodiments. Details are not described herein again.

Figure 8:
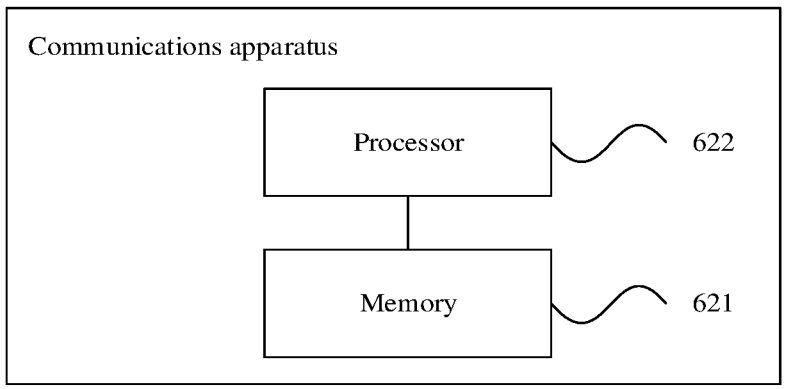
FIG. 8 is a schematic structural diagram of a communications apparatus according to another embodiment.

FIG. 8 is a schematic structural diagram of a communications apparatus according to another embodiment. As shown in FIG. 8, the communications apparatus in this embodiment may be, for example, a terminal or a chip of a terminal. The communications apparatus in this embodiment may include a memory 621 and a processor 622. The memory 621 is communicatively connected to the processor 622. In terms of hardware implementation, the transmit module 601 and the receive module 602 may be embedded in the processor 622 in a hardware form. The processor 622 may include at least one of a central processing unit (CPU), a digital signal processor (DSP), a microcontroller unit (MCU), an application-specific integrated circuit (ASIC), or a field programmable logic gate array (FPGA). The processor 622 is configured to invoke a program instruction in the memory 621 to perform the foregoing solutions.

The memory 621 is configured to store the program instruction, and the processor 622 is configured to invoke the program instruction in the memory 621 to perform the solutions performed by the terminal in the corresponding method embodiments.

The communications apparatus in this embodiment may be configured to perform the technical solutions performed by the terminal or the chip inside the terminal in the corresponding method embodiments. Implementation principles and technical effects of the communications apparatus are similar to those in the method embodiments. For functions of the modules, refer to corresponding descriptions in the method embodiments. Details are not described herein again.

Figure 9:
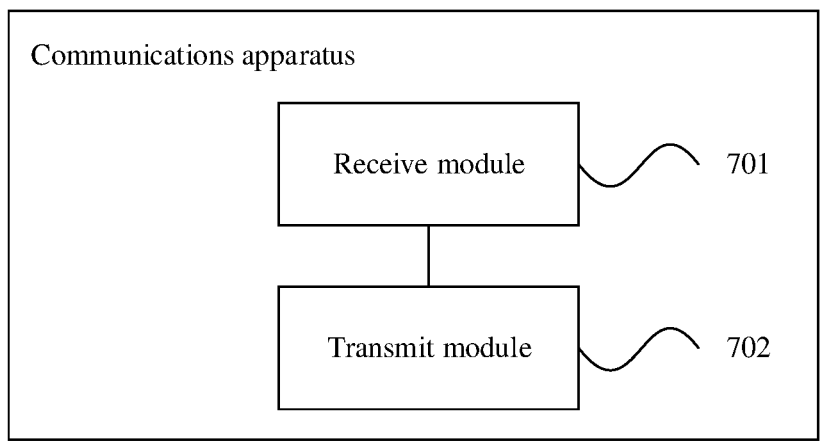
FIG. 9 is a schematic structural diagram of a communications apparatus according to another embodiment.

Another embodiment provides a communications apparatus. The communications apparatus may be a network device, or may be a chip applicable to a network device. As shown in FIG. 9, the communications apparatus in this embodiment may include a receive module 701 and a transmit module 702.

The receive module 701 is configured to receive a first request from a terminal through a first resource, where the first request is used to request BFR of a first cell or is used to request system information of the first cell, the first resource is a resource of a second cell, and the first cell and the second cell are serving cells of the terminal.

The transmit module 702 is configured to transmit, to the terminal, a first response corresponding to the first request.

In some embodiments, the transmit module 702 is further configured to transmit configuration information to the terminal, where the configuration information includes indication information of the first resource.

In some embodiments, the transmit module 702 is further configured to transmit a second association relationship between the part or all of the first resource and identification information of an uplink frequency band to the terminal.

In some embodiments, the transmit module 702 is further configured to transmit a second association relationship between the identification information of the uplink frequency band and some or all of the first resource to the terminal.

In some embodiments, the transmit module 702 is configured to transmit the first response to the terminal based on a transmission parameter of the first response, where the transmission parameter of the first response is obtained based on the part or all of the first resource for receiving the first request and the first association relationship.

In some embodiments, the first request is a random access preamble or uplink control information.

In some embodiments, the transmit module 702 is configured to transmit the first response to the terminal through the first cell.

In some embodiments, the first response is a PDCCH scrambled by using a C-RNTI, or the first response is a random access response.

In some embodiments, the transmit module 702 is configured to transmit the first response to the terminal through a serving cell of the terminal that is different from the first cell, where the first response includes identification information of the first cell.

In some embodiments, the first request further includes identification information of a first beam, and the first beam is a beam that is of the first cell and whose signal quality meets a preset condition.

In some embodiments, the first request further includes the identification information of the first cell.

In some embodiments, the receive module 701 is further configured to receive a random access preamble from the terminal through the second cell before receiving the first request from the terminal through the first resource.

The transmit module 702 is further configured to transmit, to the terminal through the second cell, a random access response corresponding to the random access preamble.

When transmitting, to the terminal, the first response corresponding to the first request, the transmit module 702 is configured to transmit the first response to the terminal through the second cell, where the first response is the PDCCH scrambled by using the C-RNTI.

In some embodiments, the transmit module 702 is configured to transmit the first response to the terminal through the second cell based on the transmission parameter of the first response, where the transmission parameter of the first response is determined based on a transmission parameter of the first beam.

The communications apparatus in this embodiment may be configured to perform the technical solutions performed by the network device/the chip of the network device in the corresponding method embodiments. Implementation principles and technical effects of the communications apparatus are similar to those in the method embodiments. For functions of the modules, refer to corresponding descriptions in the method embodiments. Details are not described herein again.

Figure 10:
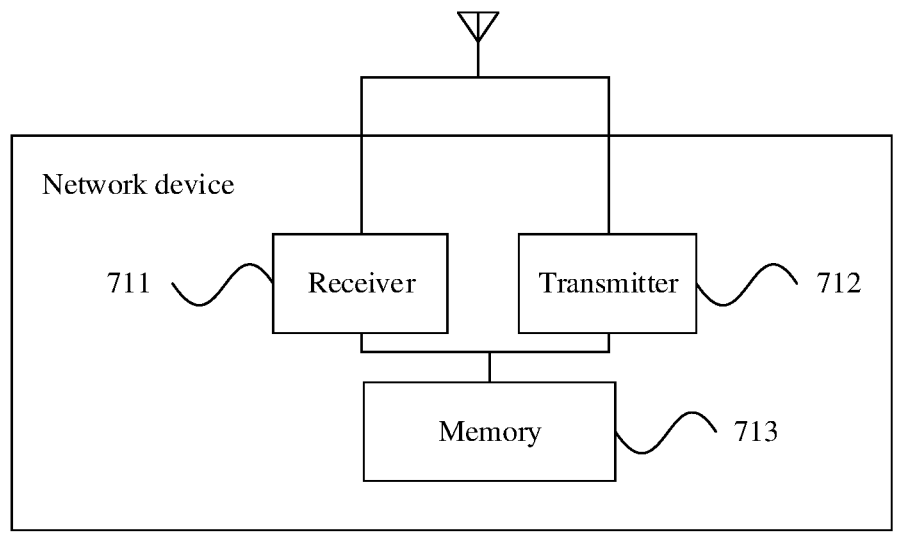
FIG. 10 is a schematic structural diagram of a network device according to an embodiment.

FIG. 10 is a schematic structural diagram of a network device according to an embodiment. As shown in FIG. 10, the network device in this embodiment may include a receiver 711 and a transmitter 712. In terms of hardware implementation, the receive module 701 may be the receiver 711 in this embodiment, and the transmit module 702 may be the transmitter 712 in this embodiment. In addition, the receiver 711 and the transmitter 712 may be combined into a transceiver.

The receiver 711 is configured to receive a first request from a terminal through a first resource, where the first request is used to request BFR of a first cell or is used to request system information of the first cell, the first resource is a resource of a second cell, and the first cell and the second cell are serving cells of the terminal.

The transmitter 712 is configured to transmit, to the terminal, a first response corresponding to the first request.

In some embodiments, the transmitter 712 is further configured to transmit configuration information to the terminal, where the configuration information includes indication information of the first resource.

In some embodiments, the transmitter 712 is further configured to transmit a first association relationship between identification information of at least one beam of the first cell and a part or all of the first resource to the terminal.

In some embodiments, the transmitter 712 is further configured to transmit a second association relationship between the part or all of the first resource and identification information of an uplink frequency band to the terminal.

In some embodiments, the transmitter 712 is configured to transmit the first response to the terminal based on a transmission parameter of the first response, where the transmission parameter of the first response is obtained based on the part or all of the first resource for receiving the first request and the first association relationship.

In some embodiments, the first request is a random access preamble or uplink control information.

In some embodiments, the transmitter 712 is configured to transmit the first response to the terminal through the first cell.

In some embodiments, the first response is a PDCCH scrambled by using a C-RNTI, or the first response is a random access response.

In some embodiments, the transmitter 712 is configured to transmit the first response to the terminal through a serving cell of the terminal that is different from the first cell, where the first response includes identification information of the first cell.

In some embodiments, the first request further includes identification information of a first beam, and the first beam is a beam that is of the first cell and whose signal quality meets a preset condition.

In some embodiments, the first request further includes the identification information of the first cell.

In some embodiments, the receiver 711 is further configured to receive a random access preamble from the terminal through the second cell before receiving the first request from the terminal through the first resource.

The transmitter 712 is further configured to transmit, to the terminal through the second cell, a random access response corresponding to the random access preamble.

When transmitting, to the terminal, the first response corresponding to the first request, the transmitter 712 is configured to transmit the first response to the terminal through the second cell, where the first response is the PDCCH scrambled by using the C-RNTI.

In some embodiments, the transmitter 712 is configured to transmit the first response to the terminal through the second cell based on the transmission parameter of the first response, where the transmission parameter of the first response is determined based on a transmission parameter of the first beam.

Optionally, the network device in this embodiment may further include a memory 713. The memory 713 is configured to store a program instruction. The receiver 711 and the transmitter 712 invoke the program instruction in the memory 713 to perform the foregoing solutions.

The network device in this embodiment may be configured to perform the technical solutions performed by the network device/the chip of the network device in the corresponding method embodiments. Implementation principles and technical effects of the network device are similar to those in the method embodiments. For functions of the modules, refer to corresponding descriptions in the method embodiments. Details are not described herein again.

Figure 11:
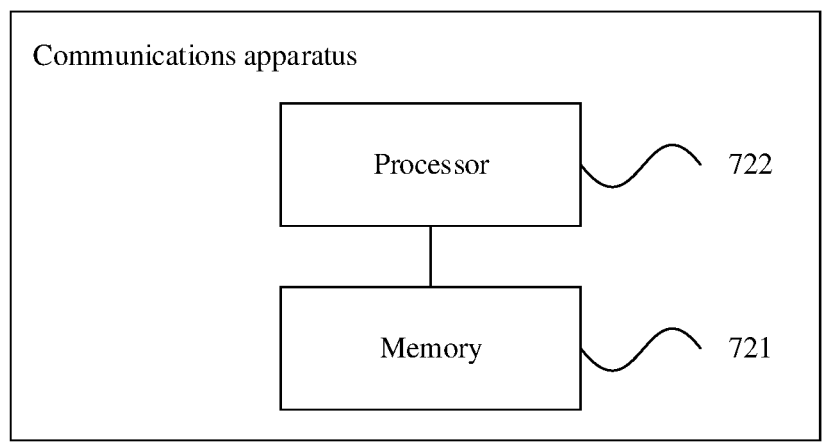
FIG. 11 is a schematic structural diagram of a communications apparatus according to another embodiment.

FIG. 11 is a schematic structural diagram of a communications apparatus according to another embodiment. As shown in FIG. 11, the communications apparatus in this embodiment may be a network device or a chip of a network device. The communications apparatus in this embodiment may include a memory 721 and a processor 722. The memory 721 is communicatively connected to the processor 722. In terms of hardware implementation, the receive module 701 and the transmit module 702 may be embedded in the processor 722 in a hardware form.

The memory 721 is configured to store a program instruction, and the processor 722 is configured to invoke the program instruction in the memory 721 to perform the solutions executed by the network device in the corresponding method embodiments.

The communications apparatus in this embodiment may be configured to perform the technical solutions performed by the network device or the chip inside the network device in the corresponding method embodiments. Implementation principles and technical effects of the communications apparatus are similar to those in the method embodiments. For functions of the modules, refer to corresponding descriptions in the method embodiments. Details are not described herein again.

Figure 12:
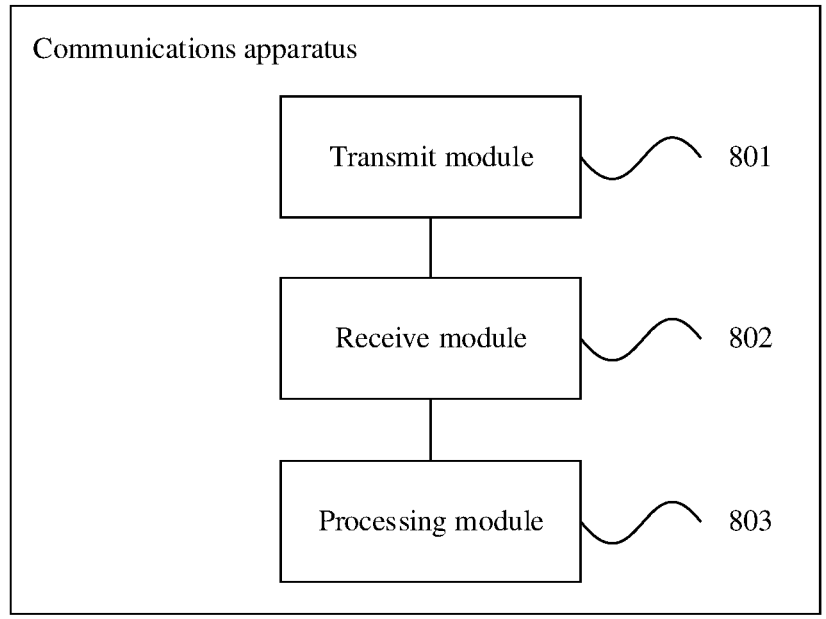
FIG. 12 is a schematic structural diagram of a communications apparatus according to another embodiment.

Another embodiment provides a communications apparatus. The communications apparatus may be a terminal, or may be applied to a chip applicable to a terminal. As shown in FIG. 12, the communications apparatus in this embodiment may include a transmit module 801, a receive module 802, and a processing module 803.

The transmit module 801 is configured to transmit a first request to a network device after a beam failure occurs in a first cell, where the first request includes an identifier of a first beam of the first cell.

The receive module 802 is configured to receive from the network device, a first response corresponding to the first request.

The processing module 803 is configured to determine a reception parameter of at least one PDCCH of a second cell based on a reception parameter of the first beam and the first response.

In a possible embodiment, the reception parameter of the PDCCH includes a reception parameter of a DMRS of the PDCCH.

In some embodiments, the first response includes identification information of the at least one PDCCH of the second cell; the processing module 803 is configured to determine, based on at least one piece of identification information in the first response and the reception parameter of the first beam, a reception parameter of at least one PDCCH identified by the at least one piece of identification information.

In a possible embodiment, the identification information of the PDCCH includes identification information of a DMRS port of the PDCCH or identification information of the DMRS of the PDCCH.

In some embodiments, the processing module 803 is configured to determine the reception parameter of the PDCCH of the second cell based on the reception parameter of the first beam and the first response.

In some embodiments, the transmit module 801 is configured to transmit the first request to the network device through a resource associated with the first beam, where the resource associated with the first beam belongs to the first cell and/or another serving cell other than the first cell.

The communications apparatus in this embodiment may be configured to perform the technical solutions performed by the terminal/the chip of the terminal in the corresponding method embodiments. Implementation principles and technical effects of the communications apparatus are similar to those in the method embodiments. For functions of the modules, refer to corresponding descriptions in the method embodiments. Details are not described again herein.

Figure 13:
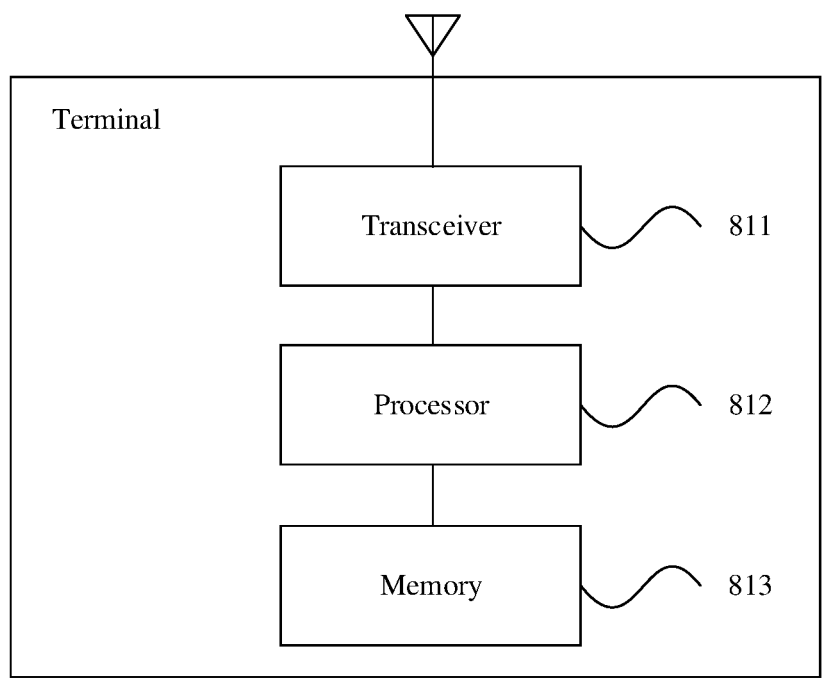
FIG. 13 is a schematic structural diagram of a terminal according to another embodiment.

FIG. 13 is a schematic structural diagram of a terminal according to another embodiment. As shown in FIG. 13, the terminal in the embodiment may include a transceiver 811 and a processor 812. In terms of hardware implementation, the transceiver 811 includes a transmitter and a receiver. The transmit module 801 may be the transmitter, and the receive module 802 may be the receiver. The processing module 803 may be the processor 812.

The transceiver 811 is configured to transmit a first request to a network device after a beam failure occurs in a first cell, where the first request includes an identifier of a first beam of the first cell; and receive from the network device, a first response corresponding to the first request.

The processor 812 is configured to determine a reception parameter of at least one PDCCH of a second cell based on a reception parameter of the first beam and the first response.

In a possible embodiment, the reception parameter of the PDCCH includes a reception parameter of a DMRS of the PDCCH.

In some embodiments, the first response includes identification information of the at least one PDCCH of the second cell; the processor 812 is configured to determine, based on at least one piece of identification information in the first response and the reception parameter of the first beam, a reception parameter of at least one PDCCH identified by the at least one piece of identification information.

In a possible embodiment, the identification information of the PDCCH includes identification information of a DMRS port of the PDCCH or identification information of the DMRS of the PDCCH.

In some embodiments, the processor 812 is configured to determine the reception parameter of the PDCCH of the second cell based on the reception parameter of the first beam and the first response.

In some embodiments, the transceiver 811 is configured to transmit the first request to the network device through a resource associated with the first beam, where the resource associated with the first beam belongs to the first cell and/or another serving cell other than the first cell.

Optionally, the terminal in this embodiment may further include a memory 813. The memory 813 is configured to store a program instruction. The transceiver 811 and the processor 812 invoke the program instruction in the memory 813 to perform the foregoing solutions.

The terminal in this embodiment may be configured to perform the technical solutions performed by the terminal/the chip of the terminal in the corresponding method embodiments. Implementation principles and technical effects of the terminal are similar to those in the method embodiments. For functions of the modules, refer to corresponding descriptions in the method embodiments. Details are not described herein again.

Figure 14:
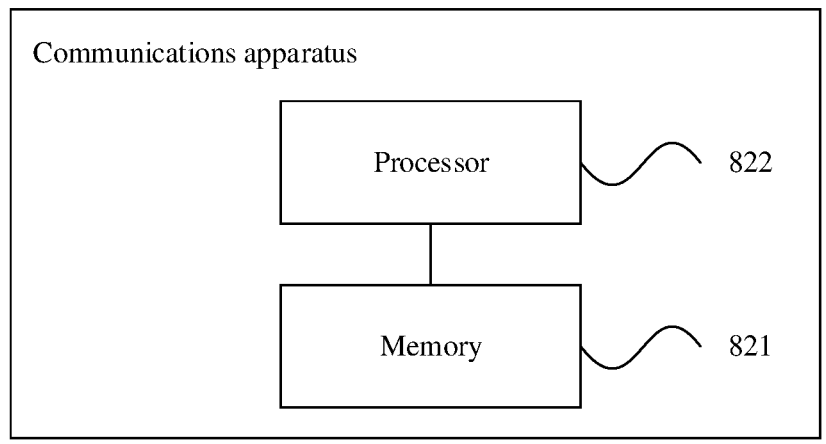
FIG. 14 is a schematic structural diagram of a communications apparatus according to another embodiment.

FIG. 14 is a schematic structural diagram of a communications apparatus according to another embodiment. As shown in FIG. 14, the communications apparatus in this embodiment may be a terminal, or may be a chip of a terminal. The communications apparatus in this embodiment may include a memory 821 and a processor 822. The memory 821 is communicatively connected to the processor 822. In terms of hardware implementation, the transmit module 801, the receive module 802, and the processing module 803 may be embedded in the processor 822 in a hardware form.

The memory 821 is configured to store a program instruction, and the processor 822 is configured to invoke the program instruction in the memory 821 to perform the solutions performed by the terminal in the corresponding method embodiments.

The communications apparatus in this embodiment may be configured to perform the technical solutions performed by the terminal or the chip inside the terminal in the corresponding method embodiments. Implementation principles and technical effects of the communications apparatus are similar to those in the method embodiments. For functions of the modules, refer to corresponding descriptions in the method embodiments. Details are not described herein again.

Figure 15:
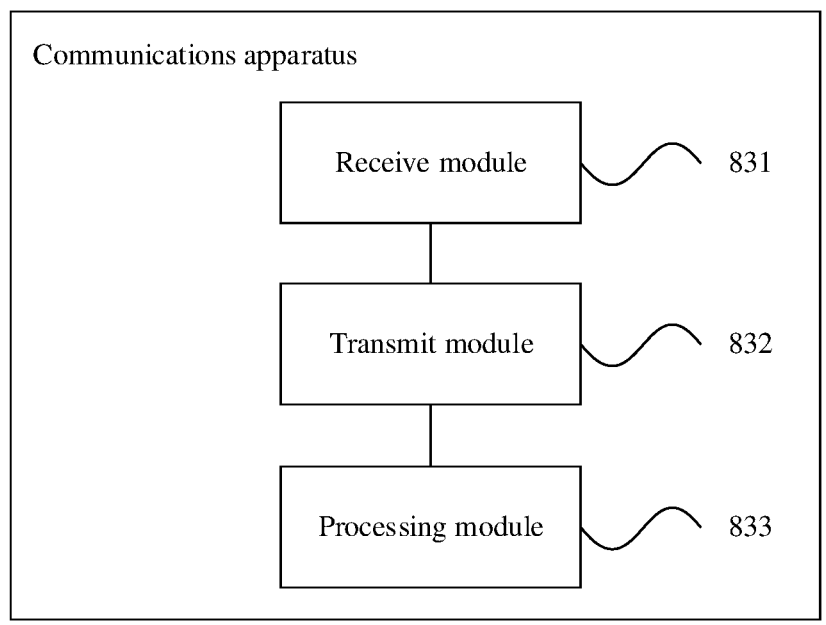
FIG. 15 is a schematic structural diagram of a communications apparatus according to another embodiment.

An embodiment provides a communications apparatus. The communications apparatus may be a network device, or may be a chip inside a network device. As shown in FIG. 15, the communications apparatus in this embodiment may include a receive module 831, a transmit module 832, and a processing module 833.

The receive module 831 is configured to receive a first request from a terminal, where the first request includes an identifier of a first beam of a first cell.

The transmit module 832 is configured to transmit, to the terminal, a first response corresponding to the first request.

The processing module 833 is configured to determine a transmission parameter of at least one PDCCH of a second cell based on a transmission parameter of the first beam.

In a possible embodiment, the transmission parameter of the PDCCH includes a transmission parameter of a DMRS of the PDCCH.

In some embodiments, the first response includes identification information of the at least one PDCCH of the second cell.

In a possible embodiment, the identification information of the PDCCH includes identification information of a DMRS port of the PDCCH or identification information of the DMRS of the PDCCH.

In some embodiments, the processing module 833 is configured to determine the transmission parameter of the PDCCH of the second cell based on the transmission parameter of the first beam.

In some embodiments, the receive module 831 is configured to receive the first request from the terminal through a resource associated with the first beam, where the resource associated with the first beam belongs to the first cell and/or another serving cell other than the first cell.

The communications apparatus in this embodiment may be configured to perform the technical solutions performed by the network device/the chip of the network device in the corresponding method embodiments. Implementation principles and technical effects of the communications apparatus are similar to those in the method embodiments. For functions of the modules, refer to corresponding descriptions in the method embodiments. Details are not described herein again.

Figure 16:
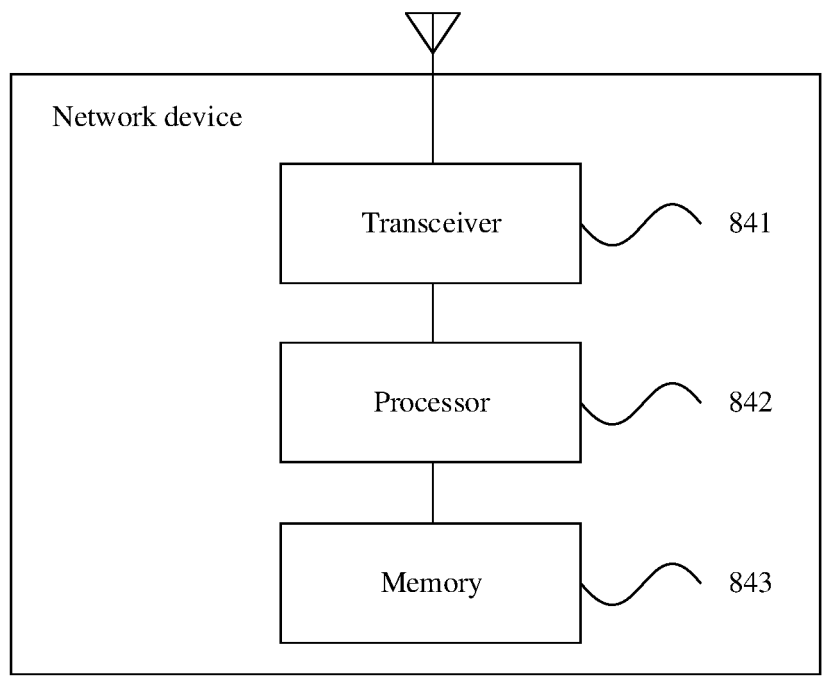
FIG. 16 is a schematic structural diagram of a network device according to another embodiment.

FIG. 16 is a schematic structural diagram of a network device according to another embodiment. As shown in FIG. 16, the network device in this embodiment may include a transceiver 841 and a processor 842. In terms of hardware implementation, the transceiver 841 includes a transmitter and a receiver. The receive module 831 may be the receiver, and the transmit module 832 may be the transmitter. The processing module 833 may be the processor 842.

The transceiver 841 is configured to receive a first request from a terminal, where the first request includes an identifier of a first beam of a first cell; and transmit, to the terminal, a first response corresponding to the first request.

The processor 842 is configured to determine a transmission parameter of at least one PDCCH of a second cell based on a transmission parameter of the first beam.

In a possible embodiment, the transmission parameter of the PDCCH includes a transmission parameter of a DMRS of the PDCCH.

In some embodiments, the first response includes identification information of the at least one PDCCH of the second cell.

In a possible embodiment, the identification information of the PDCCH includes identification information of a DMRS port of the PDCCH or identification information of the DMRS of the PDCCH.

In some embodiments, the processor 842 is configured to determine the transmission parameter of the PDCCH of the second cell based on the transmission parameter of the first beam.

In some embodiments, the transceiver 841 is configured to receive the first request from the terminal through a resource associated with the first beam, where the resource associated with the first beam belongs to the first cell and/or another serving cell other than the first cell.

Optionally, the network device in this embodiment may further include a memory 843. The memory 843 is configured to store a program instruction. The transceiver 841 and the processor 842 invoke the program instruction in the memory 843 to perform the foregoing solutions.

The network device in this embodiment may be configured to perform the technical solutions performed by the network device/the chip of the network device in the corresponding method embodiments. Implementation principles and technical effects of the network device are similar to those in the method embodiments. For functions of the modules, refer to corresponding descriptions in the method embodiments. Details are not described herein again.

Figure 17:
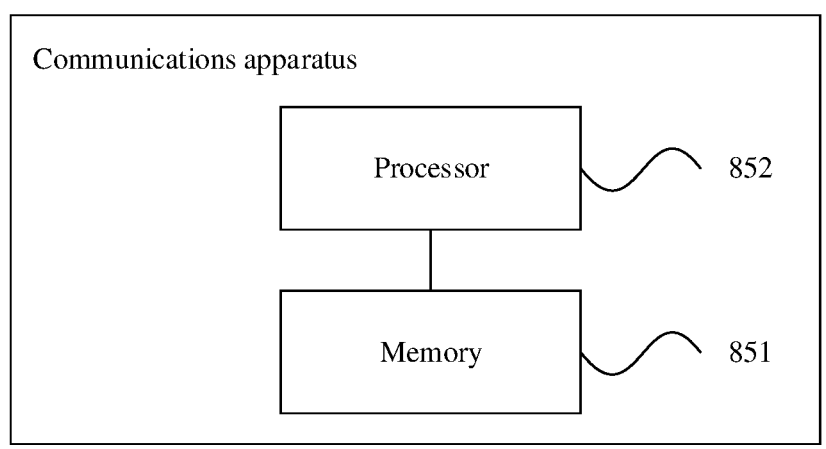
FIG. 17 is a schematic structural diagram of a communications apparatus according to another embodiment.

FIG. 17 is a schematic structural diagram of a communications apparatus according to another embodiment. As shown in FIG. 17, the communications apparatus in this embodiment may be a network device, or may be a chip of a network device. The communications apparatus in this embodiment may include a memory 851 and a processor 852. The memory 851 is communicatively connected to the processor 852. In terms of hardware implementation, the receive module 831, the transmit module 832, and the processing module 833 may be embedded in the processor 852 in a hardware form.

The memory 851 is configured to store a program instruction, and the processor 852 is configured to invoke the program instruction in the memory 851 to perform the solutions executed by the network device in the corresponding method embodiments.

The communications apparatus in this embodiment may be configured to perform the technical solutions performed by the network device or the chip inside the network device in the corresponding method embodiments. Implementation principles and technical effects of the communications apparatus are similar to those in the method embodiments. For functions of the modules, refer to corresponding descriptions in the method embodiments. Details are not described herein again.

Figure 18:
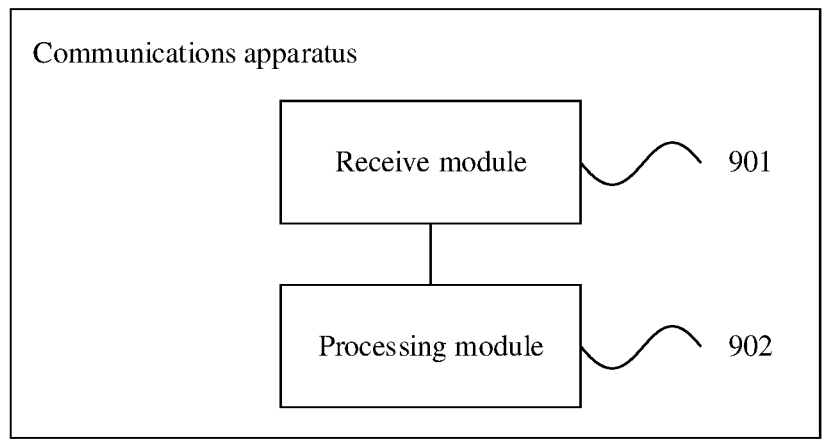
FIG. 18 is a schematic structural diagram of a communications apparatus according to another embodiment.

Another embodiment provides a communications apparatus. The communications apparatus may be a terminal, or may be a chip inside a terminal. As shown in FIG. 18, the communications apparatus in this embodiment may include a receive module 901 and a processing module 902.

The receive module 901 is configured to receive a first indication from a network device, where the first indication is used to indicate information about a reception parameter of at least one PDCCH of a first cell.

The processing module 902 is configured to determine the reception parameter of the at least one PDCCH of the first cell according to the first indication.

In a possible embodiment, the reception parameter of the PDCCH includes a reception parameter of a DMRS of the PDCCH.

In a possible embodiment, the first indication includes identification information of the at least one PDCCH of the first cell and identification information of a beam of a second cell.

The processing module 902 is, for example, configured to determine the reception parameter of the at least one PDCCH of the first cell based on the first indication and a reception parameter of the beam of the second cell.

In a possible embodiment, the identification information of the PDCCH includes identification information of a DMRS port of the PDCCH or identification information of the DMRS of the PDCCH.

The communications apparatus in this embodiment may be configured to perform the technical solutions performed by the terminal/the chip of the terminal in the corresponding method embodiments. Implementation principles and technical effects of the communications apparatus are similar to those in the method embodiments. For functions of the modules, refer to corresponding descriptions in the method embodiments. Details are not described again herein.

Figure 19:
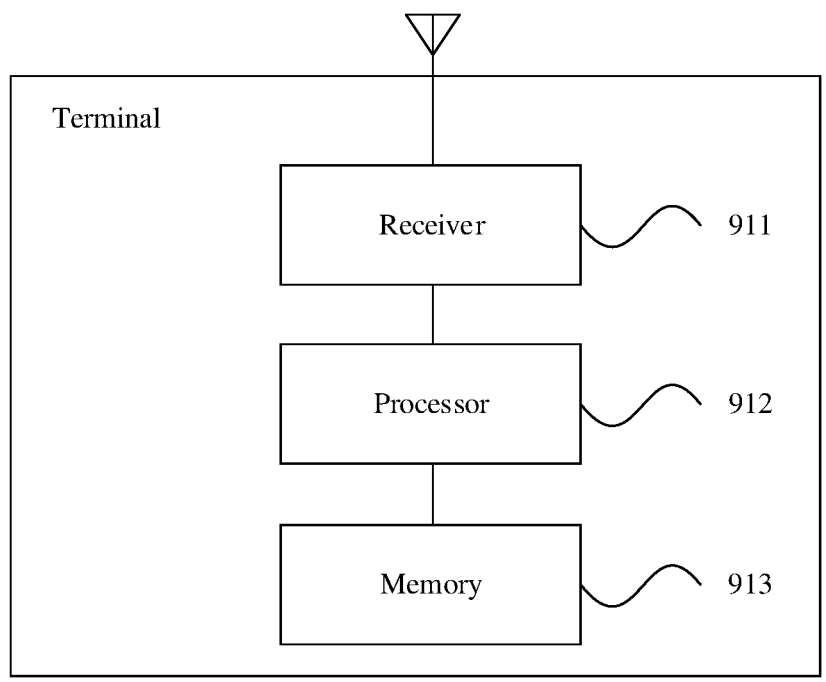
FIG. 19 is a schematic structural diagram of a terminal according to another embodiment.

FIG. 19 is a schematic structural diagram of a terminal according to another embodiment. As shown in FIG. 19, the terminal in this embodiment may include a receiver 911 and a processor 912. In terms of hardware implementation, the receive module 901 may be the receiver 911, and the processing module 902 may be the processor 912.

The receiver 911 is configured to receive a first indication from a network device, where the first indication is used to indicate information about a reception parameter of at least one PDCCH of a first cell.

The processor 912 is configured to determine the reception parameter of the at least one PDCCH of the first cell according to the first indication.

In a possible embodiment, the reception parameter of the PDCCH includes a reception parameter of a DMRS of the PDCCH.

In a possible embodiment, the first indication includes identification information of the at least one PDCCH of the first cell and identification information of a beam of a second cell.

The processor 912 is configured to determine the reception parameter of the at least one PDCCH of the first cell based on the first indication and a reception parameter of the beam of the second cell.

In a possible embodiment, the identification information of the PDCCH includes identification information of a DMRS port of the PDCCH or identification information of the DMRS of the PDCCH.

Optionally, the terminal in this embodiment may further include a memory 913. The memory 913 is configured to store a program instruction. The receiver 911 and the processor 912 invoke the program instruction in the memory 913 to perform the foregoing solutions.

The terminal in this embodiment may be configured to perform the technical solutions performed by the terminal/the chip of the terminal in the corresponding method embodiments. Implementation principles and technical effects of the terminal are similar to those in the method embodiments. For functions of the modules, refer to corresponding descriptions in the method embodiments. Details are not described herein again.

Figure 20:
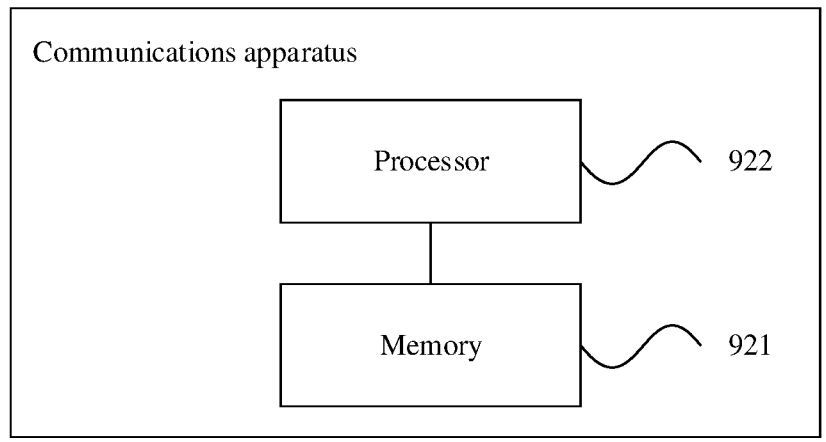
FIG. 20 is a schematic structural diagram of a communications apparatus according to another embodiment.

FIG. 20 is a schematic structural diagram of a communications apparatus according to another embodiment. As shown in FIG. 20, the communications apparatus in this embodiment may be a terminal, or may be a chip of a terminal. The communications apparatus in this embodiment may include a memory 921 and a processor 922. The memory 921 is communicatively connected to the processor 922. In terms of hardware implementation, the receive module 901 and the processing module 902 may be embedded in the processor 922 in a hardware form.

The memory 921 is configured to store a program instruction, and the processor 922 is configured to invoke the program instruction in the memory 921 to perform the solutions performed by the terminal in the corresponding method embodiments.

The communications apparatus in this embodiment may be configured to perform the technical solutions performed by the terminal or the chip inside the terminal in the corresponding method embodiments. Implementation principles and technical effects of the communications apparatus are similar to those in the method embodiments. For functions of the modules, refer to corresponding descriptions in the method embodiments. Details are not described herein again.

Figure 21:
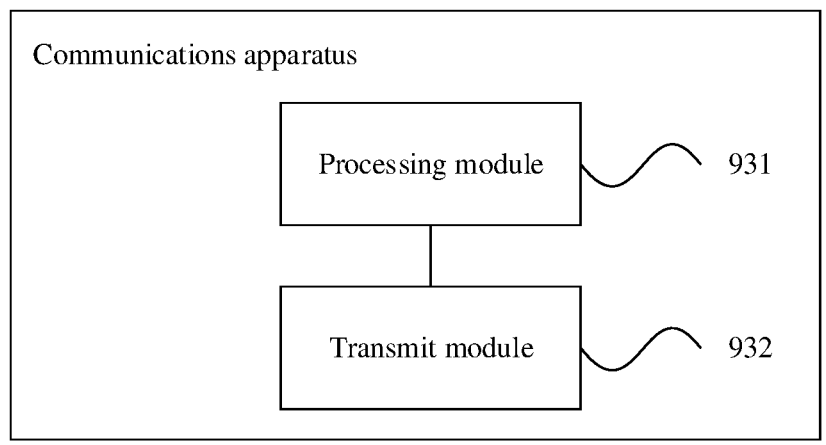
FIG. 21 is a schematic structural diagram of a communications apparatus according to another embodiment.

An embodiment provides a communications apparatus. The communications apparatus may be a network device, or may be a chip inside a network device. As shown in FIG. 21, the communications apparatus in this embodiment may include a processing module 931 and a transmit module 932.

The processing module 931 is configured to determine a transmission parameter of at least one PDCCH of a first cell.

The transmit module 932 is configured to transmit a first indication to a terminal, where the first indication is used to indicate information about a reception parameter of the at least one PDCCH of the first cell.

In a possible embodiment, the transmission parameter of the PDCCH includes a transmission parameter of a DMRS of the PDCCH, and the reception parameter of the PDCCH includes a reception parameter of the DMRS of the PDCCH.

In a possible embodiment, the processing module 931 is configured to determine the transmission parameter of the at least one PDCCH of the first cell based on a transmission parameter of a beam of a second cell.

The first indication includes identification information of the at least one PDCCH of the first cell and identification information of the beam of the second cell.

In a possible embodiment, the identification information of the PDCCH includes identification information of a DMRS port of the PDCCH or identification information of the DMRS of the PDCCH.

The communications apparatus in this embodiment may be configured to perform the technical solutions performed by the network device/the chip of the network device in the corresponding method embodiments. Implementation principles and technical effects of the communications apparatus are similar to those in the method embodiments. For functions of the modules, refer to corresponding descriptions in the method embodiments. Details are not described herein again.

Figure 22:
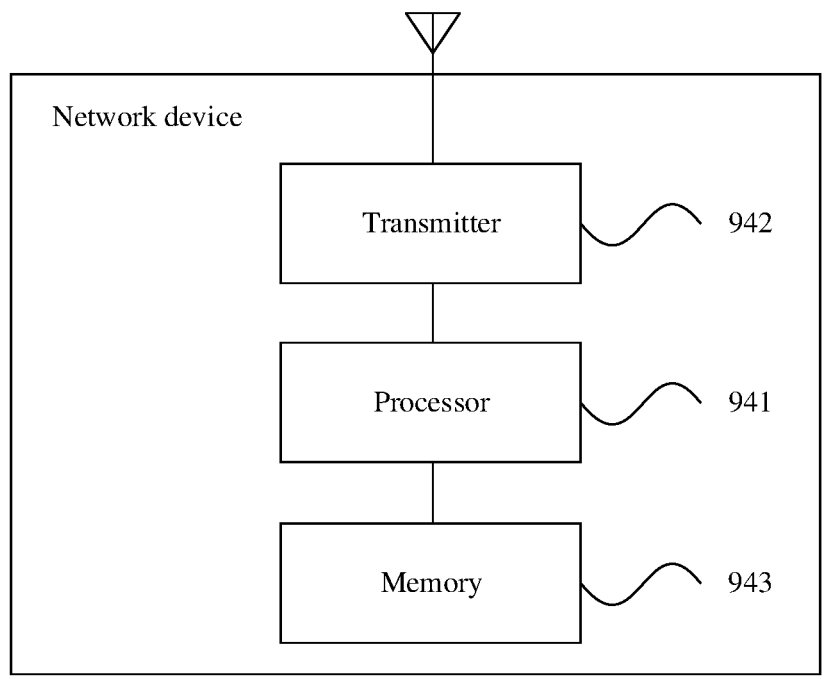
FIG. 22 is a schematic structural diagram of a network device according to another embodiment.

FIG. 22 is a schematic structural diagram of a network device according to another embodiment. As shown in FIG. 22, the network device in this embodiment may include a processor 941 and a transmitter 942. In terms of hardware implementation, the transmit module 932 may be the transmitter 942, and the processing module 931 may be the processor 941.

The processor 941 is configured to determine a transmission parameter of at least one PDCCH of a first cell.

The transmitter 942 is configured to transmit a first indication to a terminal, where the first indication is used to indicate information about a reception parameter of the at least one PDCCH of the first cell.

In a possible embodiment, the transmission parameter of the PDCCH includes a transmission parameter of a DMRS of the PDCCH, and the reception parameter of the PDCCH includes a reception parameter of the DMRS of the PDCCH.

In a possible embodiment, the processor 941 is configured to determine the transmission parameter of the at least one PDCCH of the first cell based on a transmission parameter of a beam of a second cell.

The first indication includes identification information of the at least one PDCCH of the first cell and identification information of the beam of the second cell.

In a possible embodiment, the identification information of the PDCCH includes identification information of a DMRS port of the PDCCH or identification information of the DMRS of the PDCCH.

Optionally, the network device in this embodiment may further include a memory 943. The memory 943 is configured to store a program instruction. The processor 941 and the transmitter 942 invoke the program instruction in the memory 943 to perform the foregoing solutions.

The network device in this embodiment may be configured to perform the technical solutions performed by the network device/the chip of the network device in the corresponding method embodiments. Implementation principles and technical effects of the network device are similar to those in the method embodiments. For functions of the modules, refer to corresponding descriptions in the method embodiments. Details are not described herein again.

Figure 23:
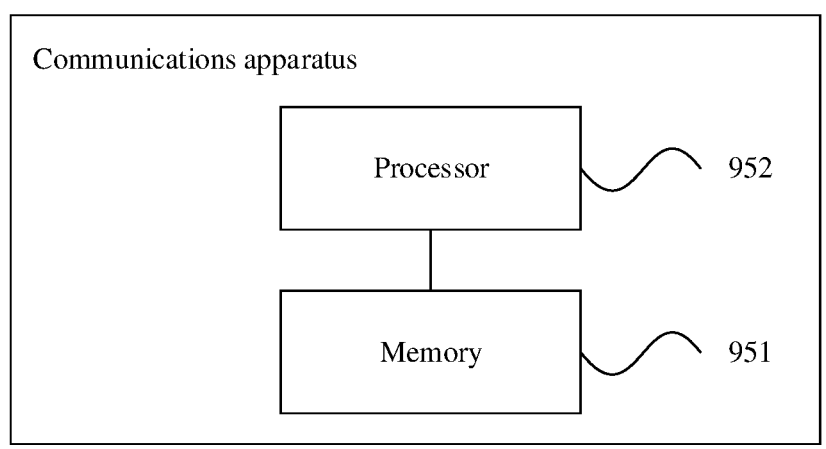
FIG. 23 is a schematic structural diagram of a communications apparatus according to another embodiment.

FIG. 23 is a schematic structural diagram of a communications apparatus according to another embodiment. As shown in FIG. 23, the communications apparatus in this embodiment may be a network device, or may be a chip of a network device. The communications apparatus in this embodiment may include a memory 951 and a processor 952. The memory 951 is communicatively connected to the processor 952. In terms of hardware implementation, the processing module 931 and the transmit module 932 may be embedded in the processor 952 in a hardware form.

The memory 951 is configured to store a program instruction, and the processor 952 is configured to invoke the program instruction in the memory 951 to perform the solutions executed by the network device in the foregoing corresponding method embodiments.

The communications apparatus in this embodiment may be configured to perform the technical solutions performed by the network device or the chip inside the network device in the corresponding method embodiments. Implementation principles and technical effects of the communications apparatus are similar to those in the method embodiments. For functions of the modules, refer to corresponding descriptions in the method embodiments. Details are not described herein again.

Figure 24:
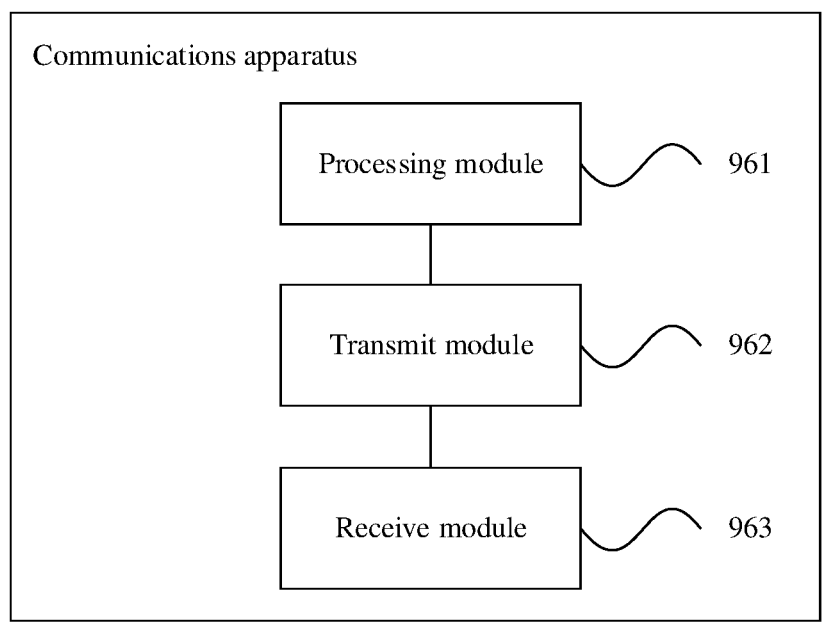
FIG. 24 is a schematic structural diagram of a communications apparatus according to another embodiment.

FIG. 24 is a schematic structural diagram of a communications apparatus according to another embodiment. As shown in FIG. 24, the communications apparatus in this embodiment may be a terminal, or may be a chip of a terminal. The communications apparatus in this embodiment may include a processing module 961, a transmit module 962, and a receive module 963.

The processing module 961 is configured to start a first timer after a beam failure of a first cell is found through detection; and determine a first beam that is of the first cell and whose signal quality meets a preset condition.

The transmit module 962 is configured to transmit a BFRQ to a network device, where the BFRQ includes identification information of the first beam.

The receive module 963 is configured to receive a BFR response from the network device during running of the first timer.

In some embodiments, the processing module 961 is configured to determine, as the first beam based on beam priorities, a beam with a highest priority in beams that are of the first cell and whose signal quality meets the preset condition, where the beam priorities in descending order include: a beam associated with a PUCCH resource, a beam associated with a CFRA CSI-RS resource, a beam associated with a CFRA SSB resource, and a beam associated with a CBFA SSB resource.

In some embodiments, the processing module 961 is further configured to start a second timer.

When determining the first beam that is of the first cell and whose signal quality meets the preset condition, the processing module 961 is configured to determine, during running of the second timer, the first beam that is of the first cell and whose signal quality meets the preset condition.

In some embodiments, the processing module 961 is further configured to: if no first beam whose signal quality meets the preset condition is determined in beams of the first cell during running of the second timer, determine that BFR fails.

In some embodiments, the processing module 961 is further configured to: if the receive module 963 receives no BFR response from the network device during running of the first timer, determine that BFR fails.

In some embodiments, in terms of hardware implementation, the processing module 961, the transmit module 962, and the receive module 963 may be embedded in a processor in a hardware form. Alternatively, in terms of hardware implementation, the processing module 961 may be a processor, the transmit module 962 may be a transmitter, and the receive module 963 may be a receiver. Alternatively, the transmit module 962 and the receive module 963 are integrated into a transceiver. Correspondingly, the communications apparatus in this embodiment may further include a memory. The memory is configured to store a program instruction. The program instruction is used to perform the foregoing solutions when invoked.

The communications apparatus in this embodiment may be configured to perform the technical solutions performed by the terminal or the chip inside the terminal in the corresponding method embodiments. Implementation principles and technical effects of the communications apparatus are similar to those in the method embodiments. For functions of the modules, refer to corresponding descriptions in the method embodiments. Details are not described herein again.

It should be noted that, in the embodiments, division into the modules is an example, and is merely a logical function division. In actual implementation, another division manner may be used. Functional modules in the embodiments may be integrated into one processing module, each of the modules may exist alone physically, or two or more modules are integrated into one module. The integrated module may be implemented in a form of hardware, or may be implemented in a form of a software functional module.

When the integrated module is implemented in the form of a software functional module and sold or used as an independent product, the integrated unit may be stored in a computer-readable storage medium. Based on such an understanding, the technical solutions essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) or a processor to perform all or some of the steps of the methods in the embodiments. The foregoing storage medium includes: any medium that can store program code, such as a USB flash drive, a removable hard disk, a ROM, a RAM, a magnetic disk, or an optical disc.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

What is claimed is:

1. A communications method implemented in a terminal, comprising:
    transmitting a first request to a network device through a first resource, wherein the first request is used to request beam failure recovery of a first cell, the first resource is a resource of a second cell, and the first cell and the second cell are serving cells of a same terminal;
    receiving a first response corresponding to the first request from the network device;
    receiving, from the network device, a first association relationship between identification information of at least one beam of the first cell and a part or all of the first resource, and
    the transmitting a first request to a network device through a first resource includes:
        transmitting the first request to the network device through the first resource based on a first beam of the first cell and the first association relationship, wherein the first beam is a beam that is of the first cell and whose signal quality meets a preset condition; and
    receiving, from the network device, a second association relationship between the part or all of the first resource and identification information of an uplink frequency band, and
    the transmitting the first request to the network device through the first resource based on the first beam of the first cell and the first association relationship includes:
    transmitting the first request to the network device through the first resource based on the first beam, the first association relationship, and the second association relationship.

2. The method according to claim 1, wherein
the receiving the first response corresponding to the first request from the network device includes:
    receiving the first response from the network device based on a reception parameter of the first response, wherein the reception parameter of the first response is determined based on a reception parameter of the first beam.

3. The method according to claim 1, wherein the receiving the first response corresponding to the first request from the network device includes:
    receiving the first response from the network device through the first cell.

4. The method according to claim 1, wherein the receiving the first response corresponding to the first request from the network device includes:
    receiving the first response from the network device through a serving cell different from the first cell, wherein the first response includes identification information of the first cell.

5. A communications method, comprising:
    receiving a first request from a terminal through a first resource, wherein the first request is used to request beam failure recovery of a first cell or is used to request system information of the first cell, the first resource is a resource of a second cell, and the first cell and the second cell are serving cells of the terminal;
    transmitting, to the terminal, a first response corresponding to the first request;
    transmitting a first association relationship between identification information of at least one beam of the first cell and a part or all of the first resource to the terminal; and
    transmitting a second association relationship between the part or all of the first resource and identification information of an uplink frequency band to the terminal.

6. The method according to claim 5, wherein the transmitting, to the terminal, the first response corresponding to the first request includes:
    transmitting the first response to the terminal based on a transmission parameter of the first response, wherein the transmission parameter of the first response is obtained based on the part or all of the first resource for receiving the first request and the first association relationship.

7. The method according to claim 5, wherein the transmitting, to the terminal, the first response corresponding to the first request includes:
    transmitting, to the terminal through the first cell, the first response corresponding to the first request.

8. The method according to claim 5, wherein the transmitting, to the terminal, the first response corresponding to the first request includes:
    transmitting the first response to the terminal through a serving cell of the terminal that is different from the first cell, wherein the first response includes identification information of the first cell.

9. A communications apparatus, comprising:
    a first circuitry, configured to transmit a first request to a network device through a first resource, wherein the first request is used to request beam failure recovery of a first cell or is used to request system information of the first cell, the first resource is a resource of a second cell, and the first cell and the second cell are serving cells of a same terminal;
    a second circuitry, configured to receive a first response corresponding to the first request from the network device;
    a receive module configured to receive configuration information from the network device, wherein the configuration information includes indication information of the first resource; and a transmit module configured to transmit the first request to the network device through the first resource based on the indication information of the first resource that is in the configuration information;

wherein the second circuitry is further configured to receive, from the network device, a first association relationship between identification information of at least one beam of the first cell and a part or all of the first resource, and the first circuitry is further configured to transmit the first request to the network device through the first resource based on a first beam of the first cell and the first association relationship, wherein the first beam is a beam that is of the first cell and whose signal quality meets a preset condition, wherein the second circuitry is further configured to receive, from the network device, a second association relationship between the part or all of the first resource and identification information of an uplink frequency band, and the first circuitry is further configured to transmit the first request to the network device through the first resource based on the first beam, the first association relationship, and the second association relationship.

10. The apparatus according to claim 9, wherein the second circuitry is configured to receive the first response from the network device based on a reception parameter of the first response, wherein the reception parameter of the first response is determined based on a reception parameter of the first beam.

11. The apparatus according to claim 9, wherein the second circuitry is configured to receive the first response from the network device through the first cell.

12. The apparatus according to claim 11, wherein the first response is a physical downlink control channel (PDCCH) scrambled by using a cell radio network temporary identifier (C-RNTI), or the first response is a random access response.

13. The apparatus according to claim 9, further comprising:

a receive module configured to receive the first response from the network device through a serving cell different from the first cell, wherein the first response includes identification information of the first cell.

* * * * *